United States Patent
Anderson et al.

(10) Patent No.: US 7,728,225 B2
(45) Date of Patent: Jun. 1, 2010

(54) FIBER DISTRIBUTION HUB WITH DUAL SWING FRAMES

(75) Inventors: Steve Anderson, Shakopee, MN (US); Craig M. Standish, Waconia, MN (US); Soutsada Vongseng, Chanhassen, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 311 days.

(21) Appl. No.: 11/864,182

(22) Filed: Sep. 28, 2007

(65) Prior Publication Data

US 2008/0079341 A1    Apr. 3, 2008

Related U.S. Application Data

(60) Provisional application No. 60/848,902, filed on Oct. 2, 2006.

(51) Int. Cl.
    *H02G 3/08* (2006.01)
(52) U.S. Cl. ............ 174/50; 174/17 A; 174/59; 174/54; 361/600; 211/26; 312/265.2
(58) Field of Classification Search ........... 174/17 A, 174/50, 59, 54; 211/26, 191, 186; 385/134, 385/135; 361/600, 601, 616, 614, 796, 724, 361/730; 312/265.1–265.4
See application file for complete search history.

(56) References Cited

U.S. PATENT DOCUMENTS

| | | |
|---|---|---|
| 1,342,269 A * | 6/1920 | Stewart ............ 312/258 |
| 3,742,119 A | 6/1973 | Newman |
| 4,644,095 A | 2/1987 | Bright et al. |
| 4,775,200 A | 10/1988 | Sheu |
| 4,890,318 A | 12/1989 | Crane et al. |
| 5,023,397 A | 6/1991 | Tomes et al. |
| 5,262,588 A | 11/1993 | Gallagher |
| 5,274,731 A | 12/1993 | White |
| 5,459,808 A | 10/1995 | Keith |
| 5,717,810 A | 2/1998 | Wheeler |
| 5,734,774 A | 3/1998 | Morrell |
| 5,737,475 A | 4/1998 | Regester |
| 5,747,734 A | 5/1998 | Kozlowski et al. |
| 5,806,948 A | 9/1998 | Rowan et al. |
| 5,911,117 A | 6/1999 | Bhame et al. |
| 5,933,563 A | 8/1999 | Schaffer et al. |
| 6,062,665 A | 5/2000 | Schneider et al. |
| 6,095,482 A | 8/2000 | LaGrotta et al. |
| 6,127,627 A | 10/2000 | Daoud |

(Continued)

FOREIGN PATENT DOCUMENTS

DE    7319283    8/1973

(Continued)

OTHER PUBLICATIONS

International Search Report and Written Opinion mailed Apr. 4, 2008.

(Continued)

*Primary Examiner*—Dhiru R Patel
(74) *Attorney, Agent, or Firm*—Merchant & Gould P.C.

(57) ABSTRACT

The present disclosure relates to a telecommunications distribution cabinet having a cabinet housing in which a first swing frame and a second swing frame are pivotably mounted.

9 Claims, 25 Drawing Sheets

U.S. PATENT DOCUMENTS

| | | | |
|---|---|---|---|
| 6,160,946 | A | 12/2000 | Thompson et al. |
| 6,238,029 | B1 * | 5/2001 | Marzec et al. ............ 312/265.3 |
| 6,316,728 | B1 * | 11/2001 | Hoover et al. ............... 174/651 |
| 6,330,152 | B1 | 12/2001 | Vos et al. |
| 6,498,293 | B2 | 12/2002 | Marchand et al. |
| 6,535,682 | B1 | 3/2003 | Puetz et al. |
| 6,556,763 | B1 | 4/2003 | Puetz et al. |
| 6,591,053 | B2 | 7/2003 | Fritz |
| 6,603,660 | B1 | 8/2003 | Ehn et al. |
| 6,606,253 | B2 * | 8/2003 | Jackson et al. ............... 361/796 |
| 6,621,975 | B2 | 9/2003 | Laporte et al. |
| 6,657,861 | B2 | 12/2003 | Irmer |
| 6,715,719 | B2 | 4/2004 | Nault et al. |
| 6,760,531 | B1 | 7/2004 | Solheid et al. |
| 6,778,752 | B2 | 8/2004 | Laporte et al. |
| 6,788,535 | B2 | 9/2004 | Dodgen et al. |
| 6,788,786 | B1 | 9/2004 | Kessler et al. |
| 6,791,027 | B1 | 9/2004 | Nicolai et al. |
| 6,792,190 | B2 | 9/2004 | Xin et al. |
| 6,792,191 | B1 | 9/2004 | Clapp, Jr. et al. |
| 6,909,833 | B2 | 6/2005 | Henschel et al. |
| 6,920,213 | B2 | 7/2005 | Pershan |
| 6,920,274 | B2 | 7/2005 | Rapp et al. |
| 6,932,443 | B1 | 8/2005 | Kaplan et al. |
| 6,945,616 | B2 | 9/2005 | Webster et al. |
| 6,980,725 | B1 | 12/2005 | Swieconek |
| 6,983,095 | B2 | 1/2006 | Reagan et al. |
| 7,086,539 | B2 | 8/2006 | Knudsen et al. |
| 7,088,899 | B2 | 8/2006 | Reagan et al. |
| 7,103,255 | B2 | 9/2006 | Reagan et al. |
| 7,139,461 | B2 | 11/2006 | Puetz et al. |
| 7,142,764 | B2 | 11/2006 | Allen et al. |
| 7,146,089 | B2 | 12/2006 | Reagan et al. |
| 7,149,398 | B2 | 12/2006 | Solheid et al. |
| 7,171,102 | B2 | 1/2007 | Reagan et al. |
| 7,194,181 | B2 | 3/2007 | Holmberg et al. |
| 7,198,409 | B2 | 4/2007 | Smith et al. |
| 7,200,317 | B2 | 4/2007 | Reagan et al. |
| 7,218,827 | B2 | 5/2007 | Vongseng et al. |
| 7,228,036 | B2 | 6/2007 | Elkins II, et al. |
| 7,233,731 | B2 | 6/2007 | Solheid et al. |
| 7,245,809 | B1 | 7/2007 | Gniadek et al. |
| 7,259,326 | B2 * | 8/2007 | Nguyen ....................... 174/50 |
| 7,273,985 | B2 | 9/2007 | Holmberg et al. |
| 7,277,620 | B2 | 10/2007 | Vongseng et al. |
| 7,298,952 | B2 | 11/2007 | Allen et al. |
| 7,330,626 | B2 | 2/2008 | Kowalczyk et al. |
| 7,333,707 | B2 | 2/2008 | Puetz et al. |
| 7,340,146 | B2 | 3/2008 | Lampert et al. |
| 7,346,254 | B2 | 3/2008 | Kramer et al. |
| 7,369,741 | B2 | 5/2008 | Reagan et al. |
| 7,376,322 | B2 | 5/2008 | Zimmel et al. |
| 7,400,813 | B2 | 7/2008 | Zimmel |
| 7,400,816 | B2 | 7/2008 | Reagen et al. |
| 7,407,330 | B2 | 8/2008 | Smith et al. |
| 7,416,349 | B2 | 8/2008 | Kramer |
| 7,418,181 | B2 | 8/2008 | Zimmel et al. |
| 7,419,384 | B2 | 9/2008 | Neumetzler et al. |
| 7,457,503 | B2 | 11/2008 | Solheid et al. |
| 7,471,869 | B2 | 12/2008 | Reagan et al. |
| 7,492,575 | B2 | 2/2009 | Irmer et al. |
| 7,515,805 | B2 | 4/2009 | Vongseng et al. |
| 7,519,259 | B2 | 4/2009 | Smith et al. |
| 2002/0125800 | A1 | 9/2002 | Knudsen et al. |
| 2004/0228598 | A1 | 11/2004 | Allen et al. |
| 2005/0111810 | A1 | 5/2005 | Giraud et al. |
| 2006/0008231 | A1 | 1/2006 | Reagan et al. |
| 2007/0165995 | A1 | 7/2007 | Reagan et al. |
| 2007/0192817 | A1 | 8/2007 | Landry |
| 2008/0008436 | A1 | 1/2008 | Reagan et al. |
| 2008/0019644 | A1 | 1/2008 | Smith et al. |
| 2008/0019655 | A1 | 1/2008 | Vongseng et al. |
| 2008/0025684 | A1 | 1/2008 | Vongseng et al. |
| 2008/0042535 | A1 | 2/2008 | Guzzo et al. |
| 2008/0042536 | A1 | 2/2008 | Guzzo et al. |
| 2008/0080829 | A1 | 4/2008 | Smith et al. |
| 2008/0124039 | A1 | 5/2008 | Gniadek et al. |
| 2008/0317425 | A1 | 12/2008 | Smith et al. |
| 2009/0022467 | A1 | 1/2009 | Puetz et al. |
| 2009/0074372 | A1 | 3/2009 | Solheid et al. |
| 2009/0087157 | A1 | 4/2009 | Smith et al. |
| 2009/0147483 | A1 | 6/2009 | Irmer et al. |
| 2009/0190896 | A1 | 7/2009 | Smith et al. |
| 2009/0196565 | A1 | 8/2009 | Vongseng et al. |

FOREIGN PATENT DOCUMENTS

| | | |
|---|---|---|
| DE | G 9105800 U1 | 6/1991 |
| DE | 4232787 C1 | 12/1993 |
| DE | 295 19 260 U1 | 12/1995 |
| DE | 296 13 420 U1 | 10/1996 |
| DE | 196 54 594 A1 | 7/1998 |
| DE | 199 27 517 A1 | 11/2000 |
| DE | 199 40 166 A1 | 3/2001 |
| DE | 199 41 413 A1 | 3/2001 |
| DE | 101 05 993 A1 | 9/2002 |
| EP | 0590286 | 4/1994 |
| EP | 0 849 850 A1 | 6/1998 |
| EP | 1 047 167 A1 | 10/2000 |
| FR | 2 752 103 | 2/1998 |
| FR | 2 766 850 | 2/1999 |
| FR | 2 776 850 | 10/1999 |
| JP | 3307618 | 5/2002 |
| JP | 3761762 | 1/2006 |
| SU | 1320857 | 12/1982 |
| WO | WO 99/27404 | 6/1999 |
| WO | WO 02/103429 A2 | 12/2002 |
| WO | WO 2007/095037 A2 | 8/2007 |

OTHER PUBLICATIONS

Copending and coassigned Reagan et al., U.S. Appl. No. 11/699,716, *Optical Communication Signal Distribution Enclosure*, filed Jan. 29, 2007.

Copending and coassigned Reagan et al., U.S. Appl. No. 12/426,723, *Parking in Fiber Distribution Hubs*, filed Apr. 20, 2009.

Copending and coassigned Reagan et al., U.S. Appl. No. 12/435,170, *Fiber Distribution Hub*, filed May 4, 2009.

Copending and coassigned Reagan et al., U.S. Appl. No. 12/435,181, *Fiber Distribution Device*, filed May 4, 2009.

Copending and coassigned Reagan et al., U.S. Appl. No. 12/603,412, *Fiber Distribution Hubs with Swing Frame Chassis*, filed Oct. 21, 2009.

Pending claims of copending and coassigned Anderson et all, U.S. Publication No. 2008/0079341, published Apr. 3, 2008, which is listed above.

Four photographs of a telecommunications cabinet that is admitted to be prior art before the Oct. 2, 2006 priority date of the present application. The panels of the cabinet are detachable from the frame.

Office Action mailed Jun. 10, 2009 in copending and coassigned U.S. Appl. No. 11/796,805, filed Apr. 30, 2007, to Smith et al.

Response to Office Action submitted Sep. 10, 2009 in copending and coassigned U.S. Appl. No. 11/796,805, filed Apr. 30, 2007, to Smith et al.

Office Action mailed Sep. 22, 2009 in copending and coassigned U.S. Appl. No. 12/368,859, filed Feb. 10, 2009, to Irmer et al.

\* cited by examiner

FIBER DISTRIBUTION HUB WITH DUAL SWING FRAMES

CROSS REFERENCE TO RELATED APPLICATION

This application claims the benefit of U.S. Provisional Patent Application Ser. No. 60/848,902, filed Oct. 2, 2006, which application is hereby incorporated by reference in its entirety.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

FIG. 1 illustrates a network 100 deploying passive fiber optic lines. As shown, the network 100 can include a central office 101 that connects a number of end subscribers 105 (also called end users 105 herein) in a network. The central office 101 can additionally connect to a larger network such as the Internet (not shown) and a public switched telephone network (PSTN). The network 100 can also include fiber distribution hubs (FDHs) 103 having one or more optical splitters (e.g., 1-to-8 splitters, 1-to-16 splitters, or 1-to-32 splitters) that generate a number of individual fibers that may lead to the premises of an end user 105. The various lines of the network 100 can be aerial or housed within underground conduits.

The portion of the network 100 that is closest to central office 101 is generally referred to as the F1 region, where F1 is the "feeder fiber" from the central office 101. The portion of the network 100 closest to the end users 105 can be referred to as an F2 portion of network 100. The network 100 includes a plurality of break-out locations 102 at which branch cables are separated out from the main cable lines. Branch cables are often connected to drop terminals 104 that include connector interfaces for facilitating coupling of the fibers of the branch cables to a plurality of different subscriber locations 105.

Splitters used in an FDH 103 can accept a feeder cable F1 having a number of fibers and may split those incoming fibers into, for example, 216 to 432 individual distribution fibers that may be associated with a like number of end user locations. In typical applications, an optical splitter is provided prepackaged in an optical splitter module housing and provided with a splitter output in pigtails that extend from the module. The splitter output pigtails are typically connectorized with, for example, SC, LC, or LX.5 connectors. The optical splitter module provides protective packaging for the optical splitter components in the housing and thus provides for easy handling for otherwise fragile splitter components. This modular approach allows optical splitter modules to be added incrementally to FDHs 103 as required.

SUMMARY

Certain aspects of the disclosure relate to fiber optic cable systems.

In example systems, a fiber distribution system includes one or more telecommunications cabinets (e.g., fiber distribution hubs) that provide an interface between the central office and the subscribers.

Example telecommunications cabinets include cabinets housing first and second swing frames configured to pivot about generally parallel pivot axes.

Certain aspects of the disclosure relate to cable routing configurations adapted for use with a dual swing frame cabinet having centrally located pivot axes.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

DETAILED DESCRIPTION

Referring now to the figures, an example telecommunications cabinet 200, such as a fiber distribution hub (FDH), having features that are examples of inventive aspects in accordance with the principles of the present disclosure is shown. The cabinet 200 provides an interconnect interface for optical transmission signals at a location in the network where operational access and reconfiguration are desired. Embodiments of the cabinet 200 can provide termination, splicing, interconnection, splitting, and combinations thereof. As the term is used herein, "a connection" between fibers includes both direct and indirect connections.

Figure 1:
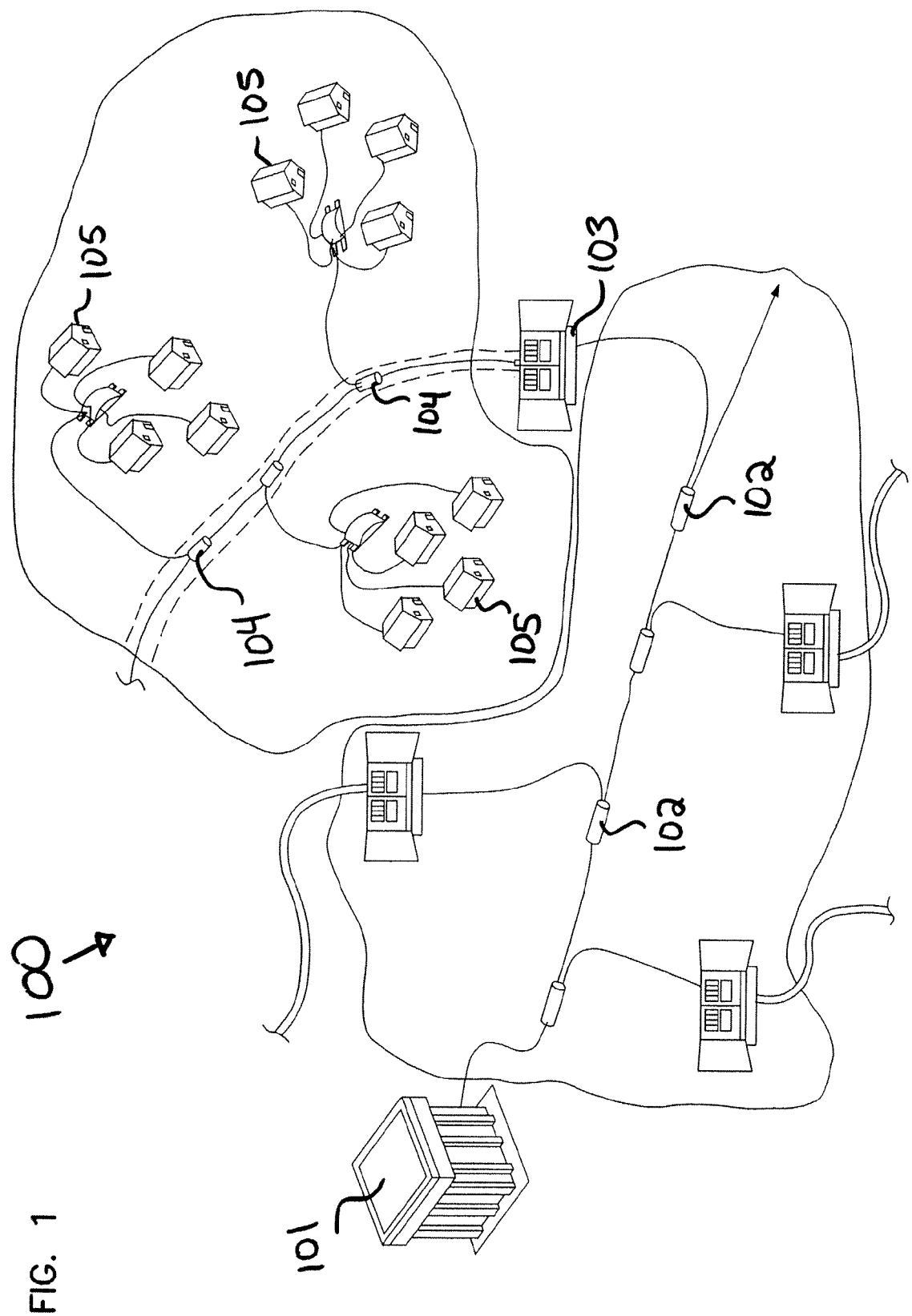
FIG. 1 shows a passive fiber optic network.

A cabinet 200 typically administers connections between fiber optic cables and passive optical splitters in an Outside Plant (OSP) environment (see FIG. 1). For example, as noted above, a cabinet 200 can be used to splice or otherwise connect one or more feeder cables, split the feeder cables, and terminate the split feeder cables to subscriber cables. In addition, the cabinet 200 is designed to accommodate a range of alternative sizes and fiber counts and support factory installation of pigtails, fanouts and splitters.

Figure 2:
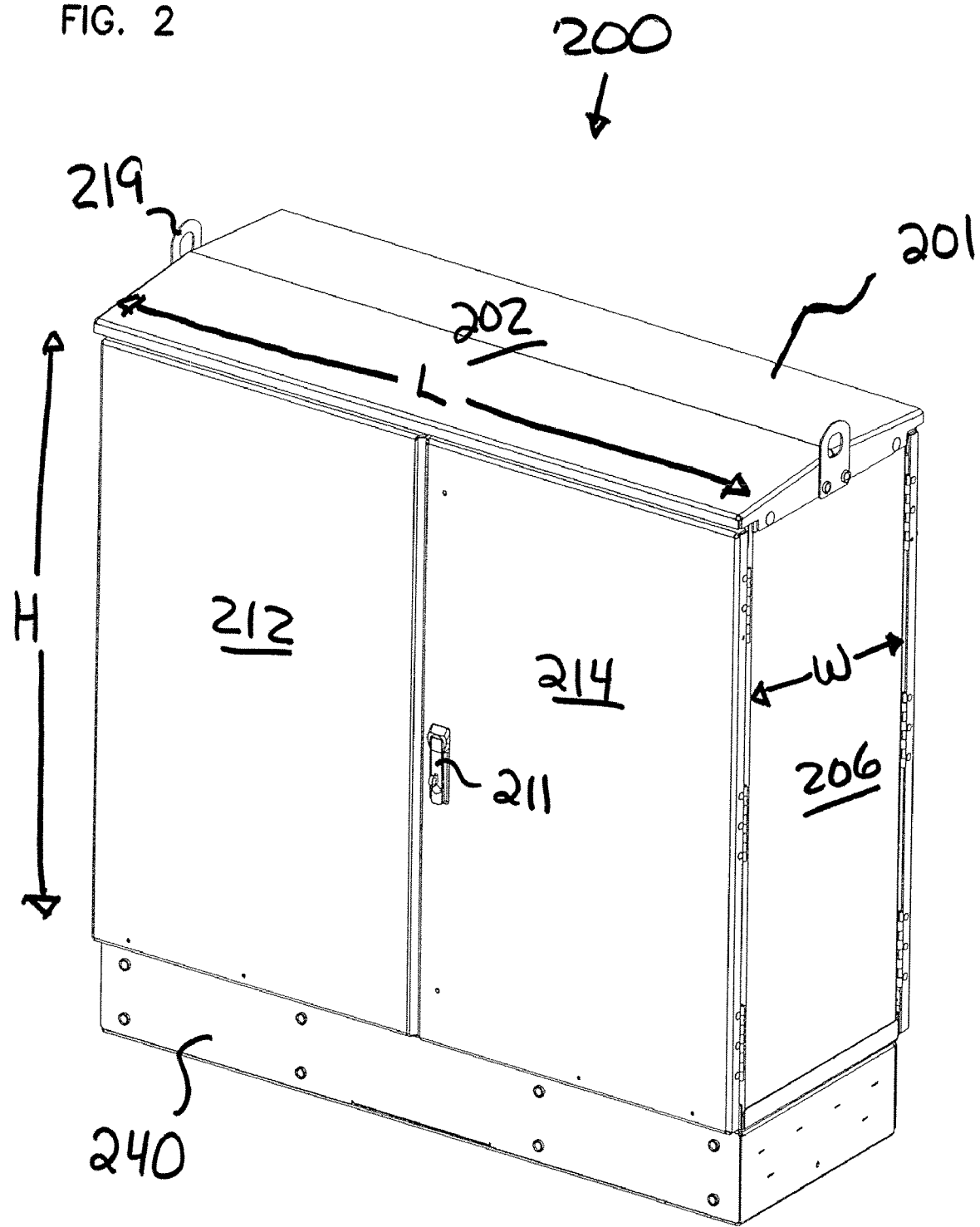
FIG. 2 is a front perspective view of an example telecommunications cabinet having a cabinet housing with front doors shown in a closed position.
Figure 3:
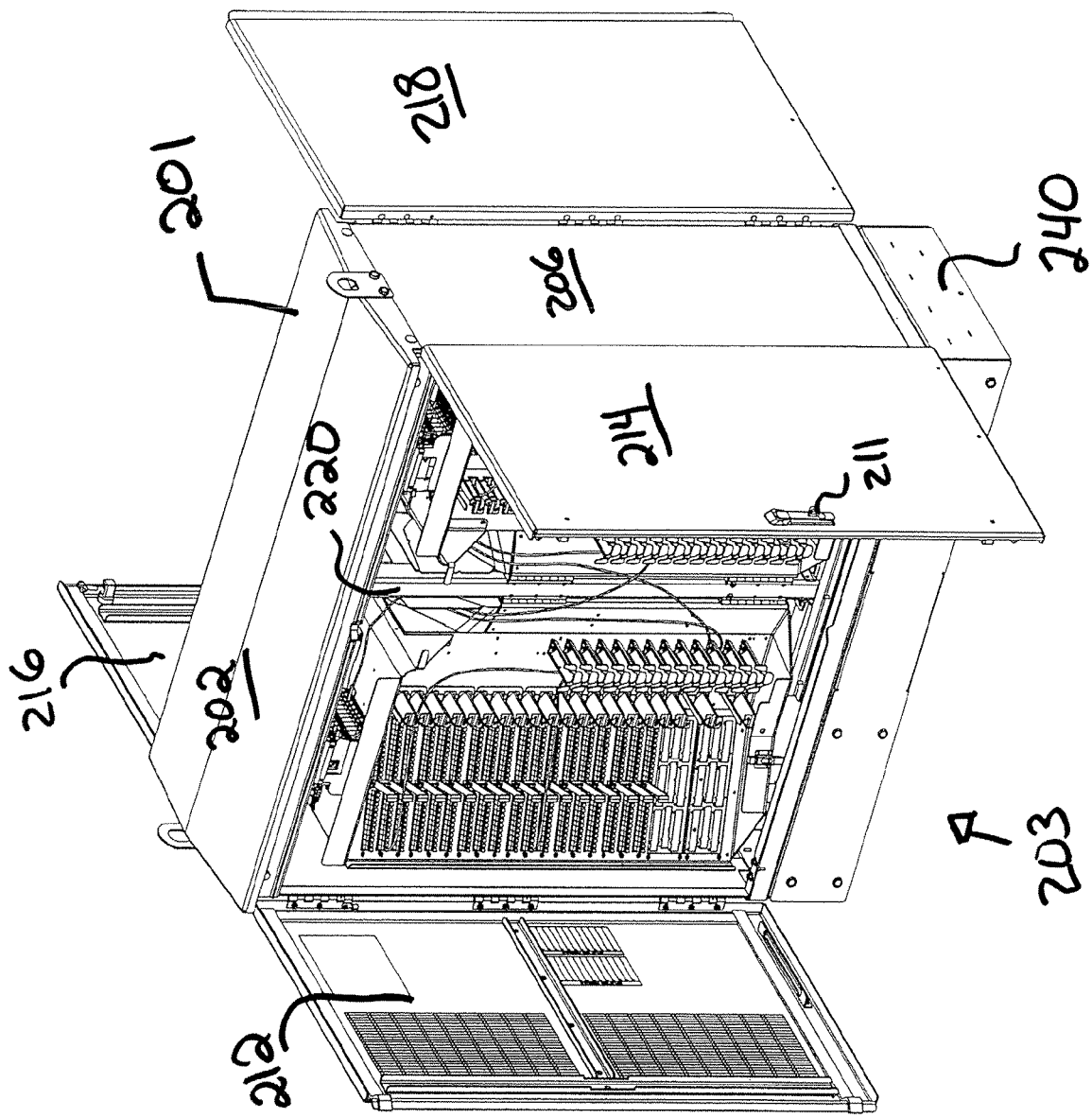
FIG. 3 is a front, perspective view of the cabinet of FIG. 2 with the front and rear doors in an open position.
Figure 4:
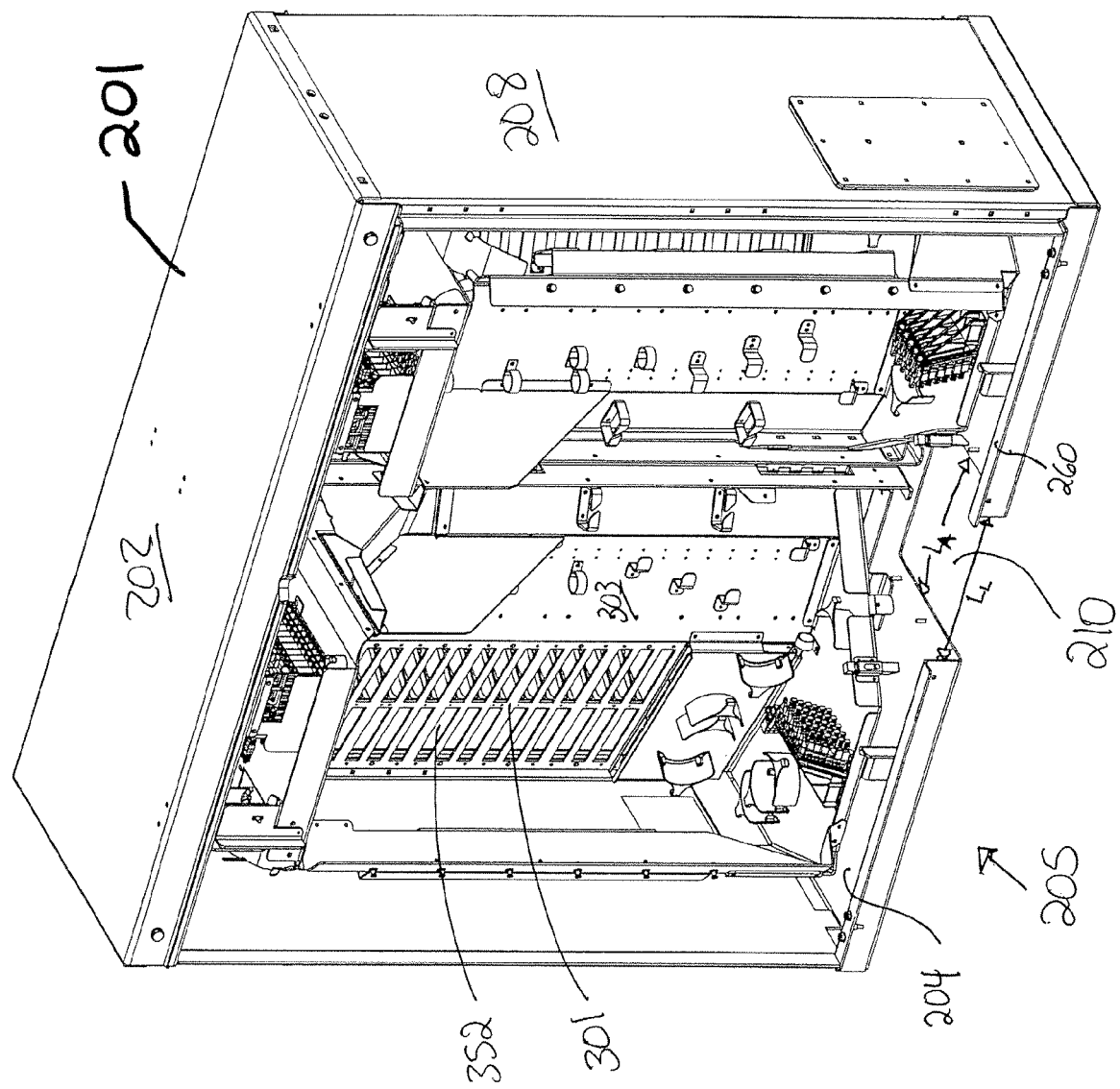
FIG. 4 is a rear, perspective view of the cabinet of FIG. 2 with the rear doors removed.

Referring to FIGS. 2 and 3, one example telecommunications cabinet 200 includes a cabinet housing 201 that houses internal components, as described further below. In one embodiment, the cabinet housing 201 has a length L extending from a first side panel 206 to a second side panel 208 (FIG. 4), a width W extending from an open front 203 (FIG. 3), to an open rear 205 (FIG. 4), and a height H extending from a top panel 202 to a bottom panel 204 (FIG. 4). The top, bottom and side panels 202, 204, 206, 208 define a cabinet interior accessible through the open front 203 (FIG. 3), and through the open rear 205 (FIG. 4) of the cabinet housing 201.

A first front door 212 and a second front door 214 (FIG. 8) mount to the front 203 of the cabinet housing 201. The front doors 212, 214 pivot from a closed position, in which the doors 212, 214 cover the open front 203 (see FIG. 2), to an open position to facilitate access through the open front 203 to the internal components mounted within cabinet housing 201. In one embodiment, the front doors 212, 214 include a lock 211. In some embodiments, first and second rear doors 216, 218 pivotably mount to the rear of the cabinet housing 201 (FIG. 3). The rear doors 216, 218 pivot to a closed position to cover the open rear 205 and to an open position (see FIG. 3) to facilitate access to the internal components of the cabinet 200 through the open rear 205. In alternative embodiments, the open rear side of the cabinet can be enclosed by a rear panel.

Figure 5:
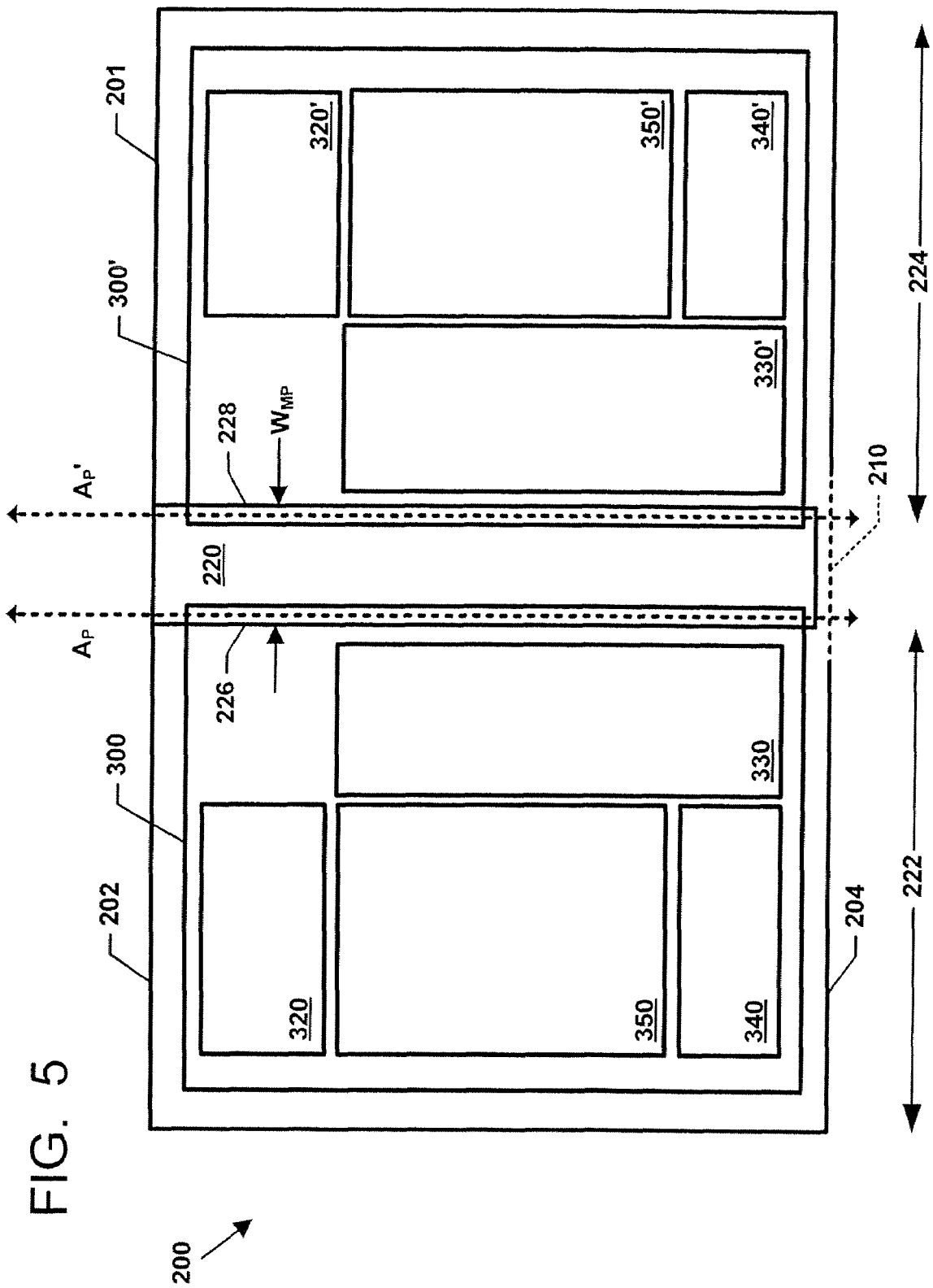
FIG. 5 is a schematic block diagram showing a first swing frame and a second swing frame pivotably mounted within the cabinet of FIG. 2.

As shown in FIG. 3, the cabinet housing 201 typically houses a mounting post 220 (also see FIG. 6) extending from the top panel 202 to the bottom panel 204 at the front 203 of the cabinet housing 201. The mounting post 220 has a width $W_{MP}$ (FIG. 5). Typically, the mounting post 220 is positioned at approximately equal distances from the first and second side panels 206, 208. In certain embodiments, the mounting post 220 is removably coupled to the cabinet housing 201.

The cabinet housing 201 also includes a cable access region 210 (FIG. 4) defining an opening through which cables can enter and exit the interior of the cabinet housing 201. Typically, the cable access region 210 is defined in the bottom panel 204 at the rear 205 of the cabinet housing 201. In other embodiments, however, the cable access region 210 can also be provided in a rear panel (not shown) or in one of the side panels 206, 208.

A mounting bulkhead 225 (see FIGS. 21 and 22) extends rearwardly within the cabinet interior from the mounting post 220 to the open rear 205. The mounting bulkhead 225 generally extends over the cable access region 210. Cable management devices, such as cable clamps 227 (FIG. 22), are provided on at least one side of the mounting bulkhead 225. Typically, the cable management devices 227 are provided on both sides 222, 224 of the mounting bulkhead 225. Telecommunications cables (e.g., feeder cables and subscriber cables) extend through the cable access region 210 and couple to the mounting bulkhead 225 using the cable management devices 227 (FIG. 22).

In addition, the cabinet housing 201 can include one or more carry handles 219 (FIG. 2) for facilitating deployment of cabinet 200 at a desired location. The handles 219 can be in the shape of loops and can be used to position the cabinet using a crane. In particular, the crane can lower the cabinet housing 201 into an underground region. In some embodiments, the loops 219 are removable or can be adjusted to not protrude from the top cabinet panel 202.

The cabinet housing 201 is typically manufactured from heavy gauge aluminum and is NEMA-4X rated. The cabinet housing 201 is configured to provide protection against rain, wind, dust, rodents and other environmental contaminants. At the same time, the cabinet housing 201 remains relatively lightweight for easy installation, and breathable to prevent accumulation of moisture in the unit. An aluminum construction with a heavy powder coat finish also provides for corrosion resistance. Other materials can be used without limitation.

Different sizes of the cabinet 200 are typically available to correspond to different subscriber cable fiber counts including, for example, 144, 216, and 432. Alternative sizes for the cabinet 200 can be used without limitation. Additional details regarding example telecommunication cabinet housings similar to cabinet housing 201 can be found in U.S. patent application Ser. No. 11/203,157 filed on Aug. 15, 2005, the entirety of which is hereby incorporated by reference.

Figure 10:
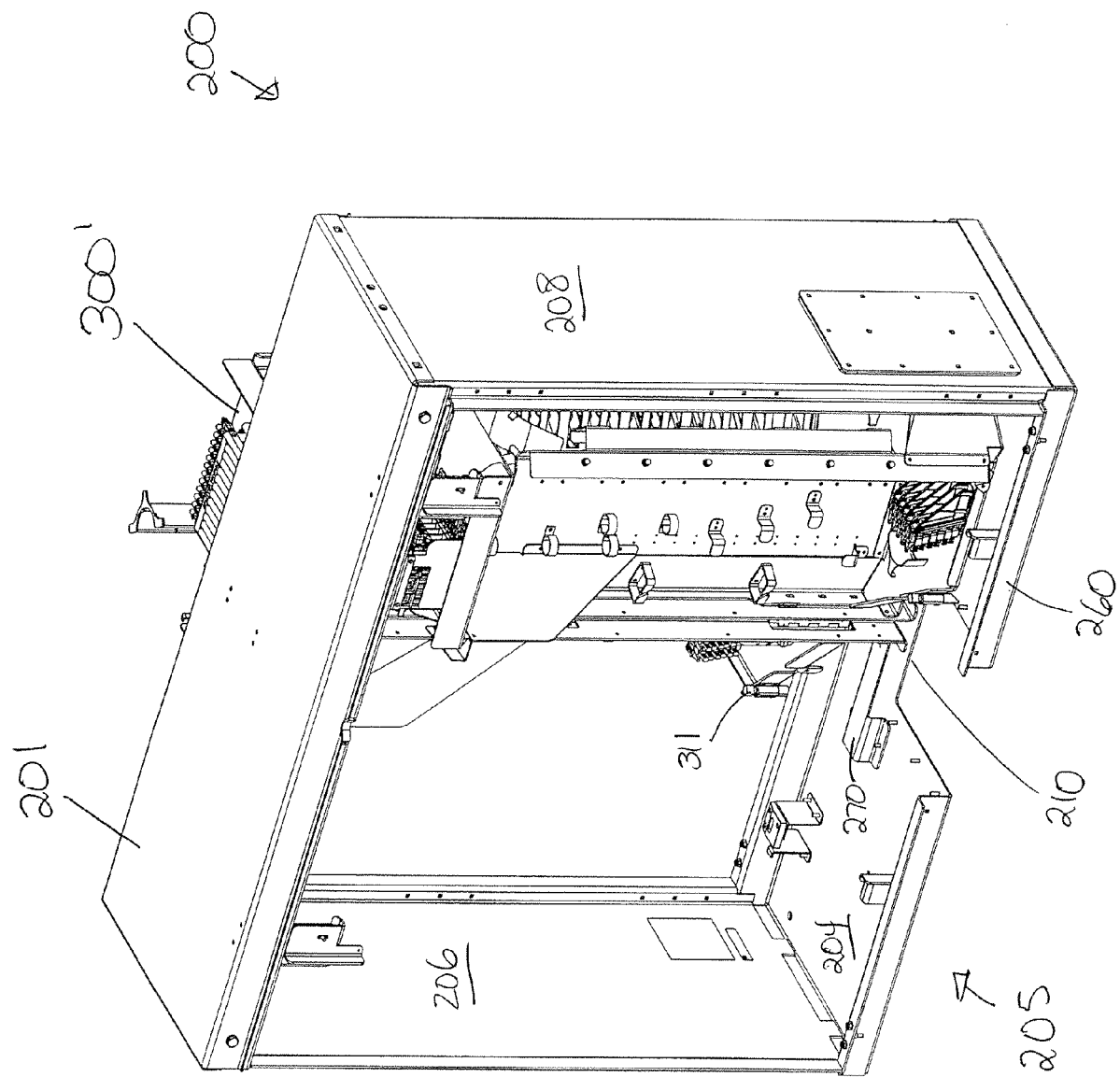
FIG. 10 is a rear, perspective view of the cabinet of FIG. 8.

Referring now to FIGS. 5 and 10, the internal components will now be discussed. As shown in FIG. 5, the mounting bulkhead 225 generally divides the interior into a first portion 222 and a second portion 224. A first swing frame 300 is pivotably mounted to a first side 226 of the mounting post 220 within the first portion 222 of the cabinet interior (FIG. 5). A second swing frame 300' is pivotably mounted to a second, opposite side 228 of the mounting post 220 within the second portion 224 of the cabinet interior (FIG. 5). In the example illustrated in FIGS. 6 and 7, hinges 314 couple front sides of the swing frames 300, 300' to the mounting post 220.

Figure 6:
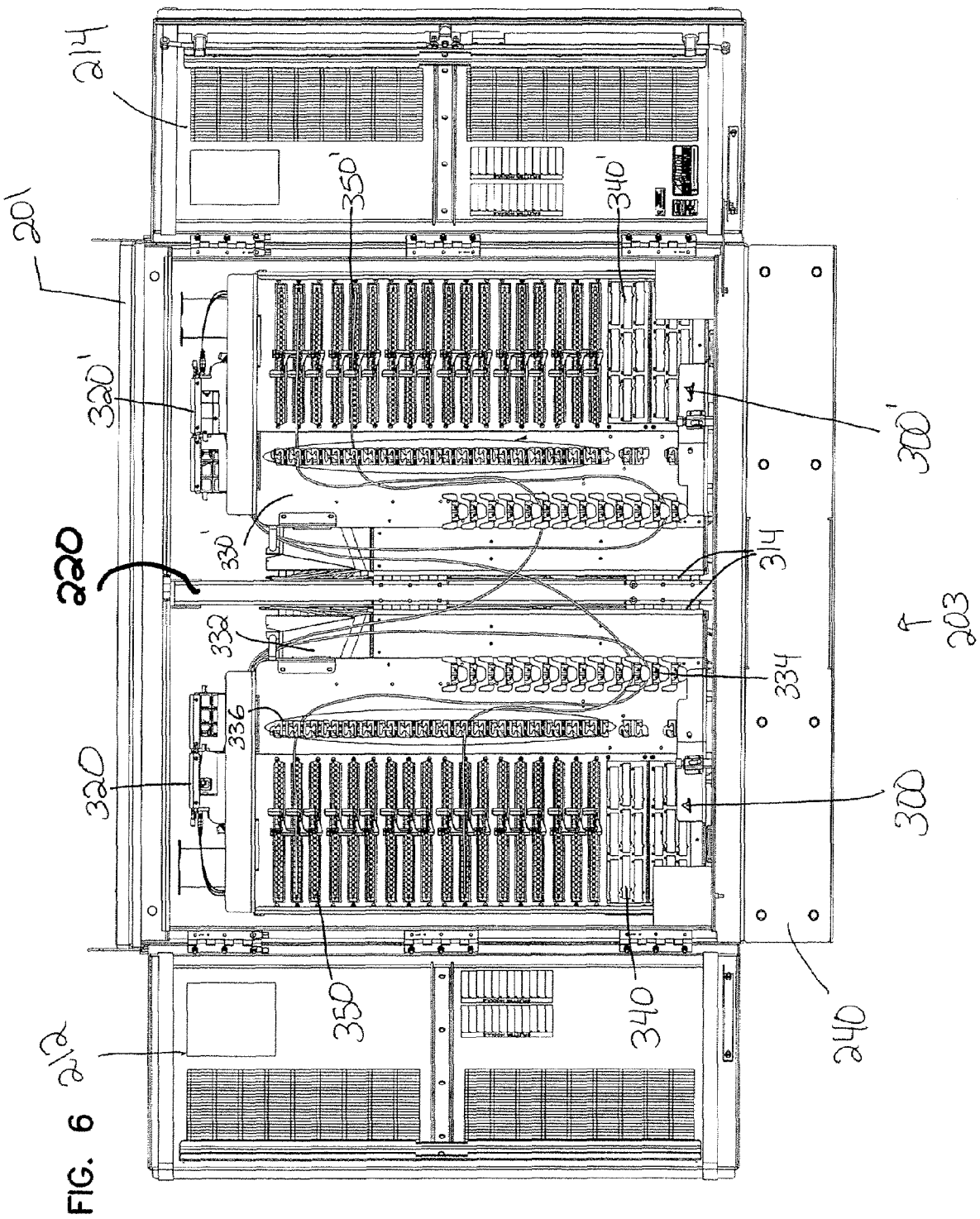
FIG. 6 is a front view of the cabinet of FIG. 2 with the front doors in the open position and the first and second swing frames visible through an open front.

In the example shown, a first termination region 350 and a second termination region 350' are provided on the first and second swing frames 300, 300', respectively (FIGS. 5 and 6). Each of the swing frames 300, 300' also includes a splitter region 320, 320', a cable management region 330, 330', and a storage region 340, 340', respectively. Typically, the splitter regions 320, 320' are located above the termination regions 350, 350' and the storage regions 340, 340' are located beneath the termination regions 350, 350' (FIG. 5). Each swing frame 300, 300' also can include a cable interface region 310, 310' (FIG. 11) in the rear of the swing frame 300, 300'. In other embodiments, however, one or more of these regions can be located within the cabinet housing 201, but not on either of the swing frames 300, 300'.

Figure 7:
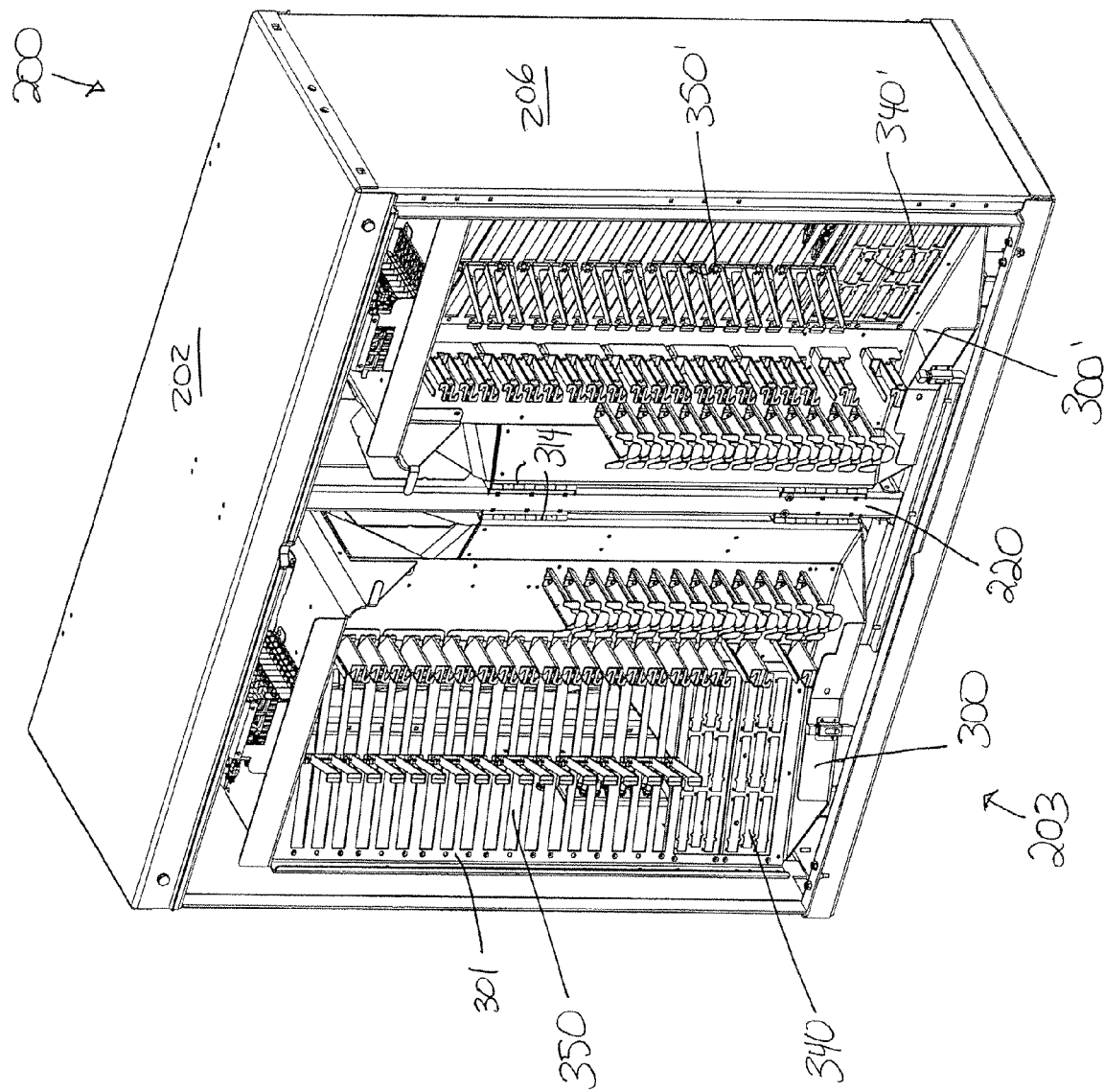
FIG. 7 is a front, perspective view of the cabinet of FIG. 2 with the front doors removed to reveal the front of the first and second swing frames.

The first swing frame 300 is configured to pivot about a first pivot axis $A_P$, which extends generally parallel to the mounting post 220 (FIG. 5). The second swing frame 300' is configured to pivot about a second pivot axis $A_P'$, which extends generally parallel to the mounting post 220 and is spaced from the first pivot axis $A_P$ approximately by the width $W_{MP}$ of the mounting post 220 (FIG. 5). Typically, both pivot axes $A_P$, $A_P'$ are located adjacent the front 203 of the cabinet housing 201 (FIG. 7).

Figure 8:
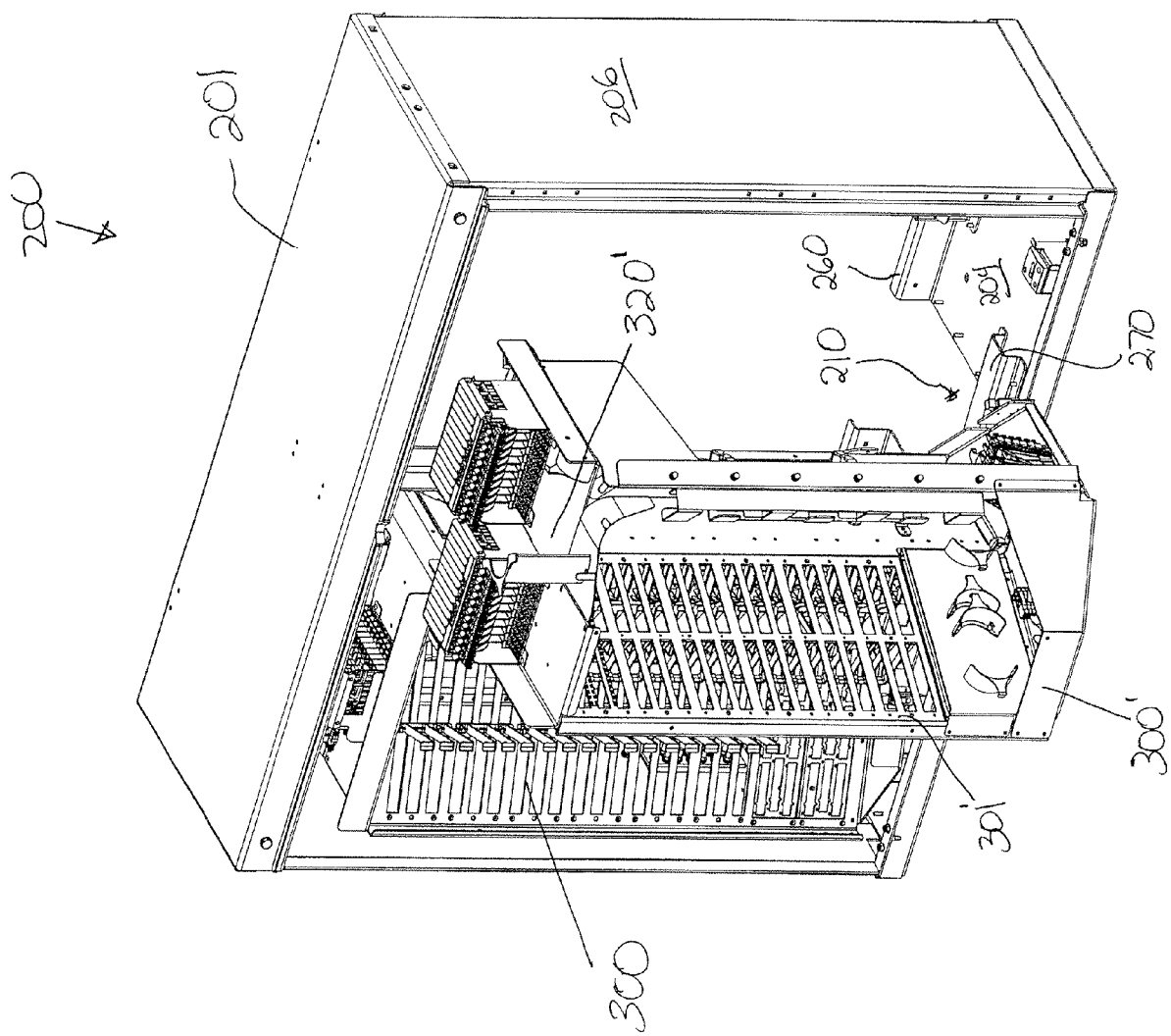
FIG. 8 is a front, perspective view of the cabinet of FIG. 2 with the rear doors removed, the first swing frame pivoted within the cabinet interior, and the second swing frame pivoted out of the cabinet interior.
Figure 9:
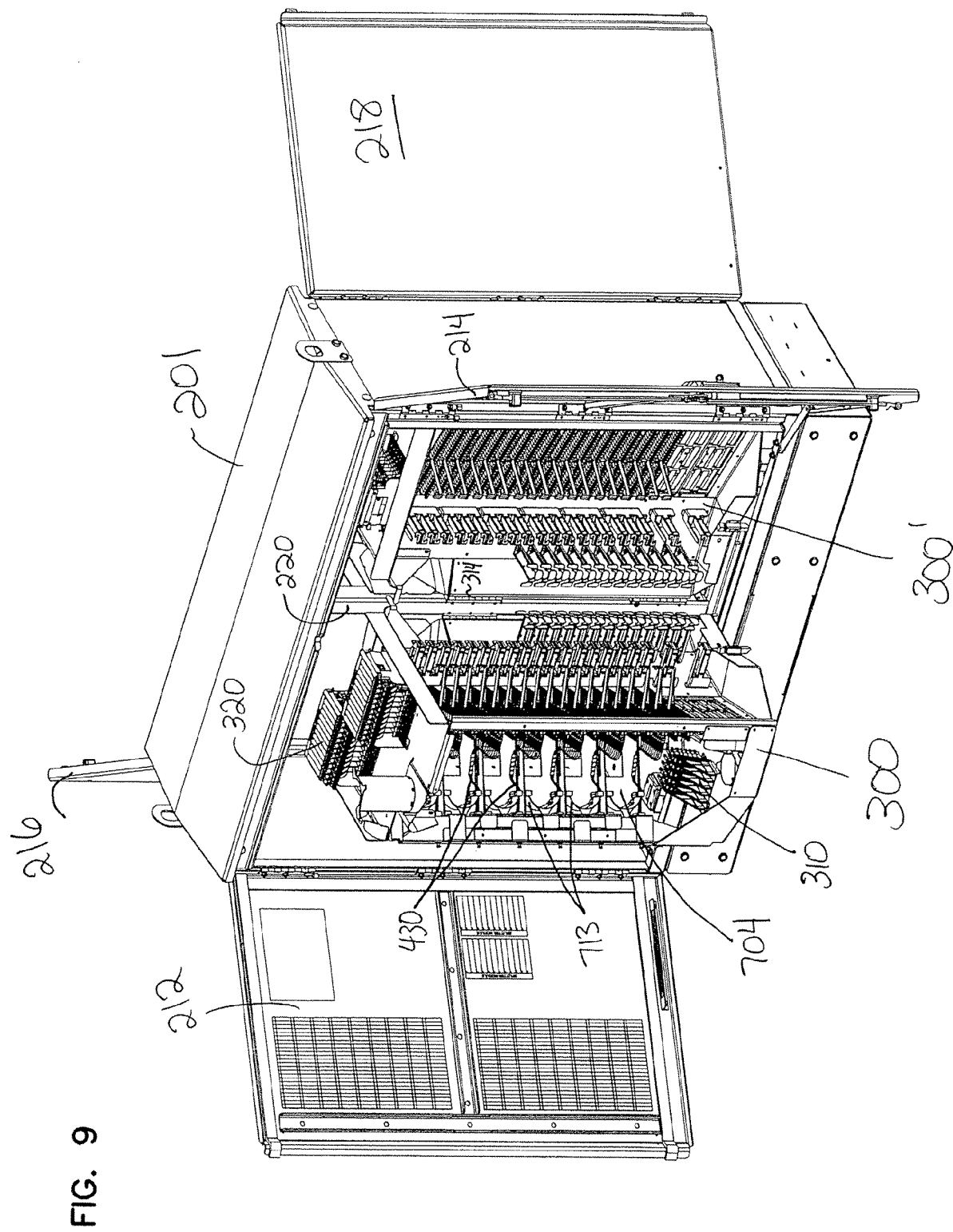
FIG. 9 is a front, perspective view of the cabinet of FIG. 2 with the first swing frame pivoted out of the cabinet interior and the second swing frame pivoted within the cabinet interior.

As shown in FIGS. 8-10, each swing frame 300, 300' is configured to pivot out of the cabinet interior through the open front 203. In some example embodiments, the swing frame 300 can be pivoted approximately ninety degrees or more out of the cabinet 201. The swing frames 300, 300' can include latches or other structures 311 (FIG. 17) to selectively lock the swing frame into a first, "swung in" position and into a second, "swung out" position.

Pivoting the swing frames 300, 300' out of the cabinet housing 201 facilitates access to components installed on the swing frames 300, 300' for cleaning, testing, maintenance, additions, etc. For example, as shown in FIG. 8, pivoting the second swing frame 300' into an open position facilitates access to a rear side of the termination region 350', the splitter region 320', and the cable interface region 310'. As shown in FIG. 10, pivoting the swing frames 300, 300' into the open position also facilitates access to the cable access region 210 and the mounting bulkhead 225 through the open rear 205 of the cabinet housing 201.

Figure 11:
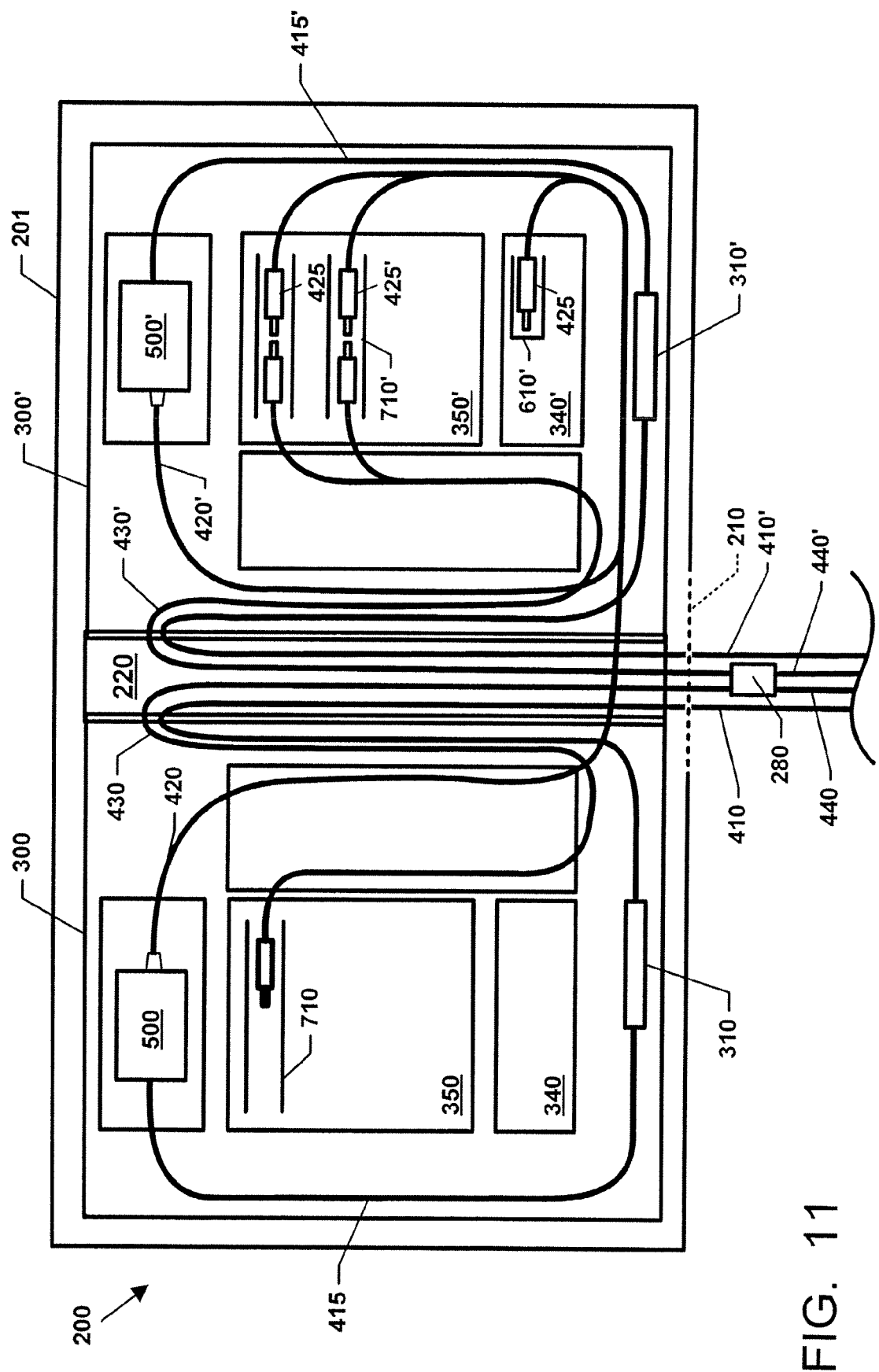
FIG. 11 is a schematic diagram of first and second cable routing paths according to one embodiment of the present disclosure.

Referring now to FIGS. 11-20, telecommunications cables can be routed within the cabinet housing 201 according to various cable routing schemes. FIG. 11 shows one example cable routing scheme by which incoming fibers can be optically coupled to outgoing fibers. Examples of incoming fibers include the fibers of feeder cables 410 that enter the cabinet housing 201 and intermediate fibers (e.g., connectorized pigtails 420 extending from splitters and patching fibers/jumpers) that connect the feeder cable fibers to the termination regions 350, 350'. Examples of outgoing fibers include the fibers of subscriber cables 440 and the fibers of stub cables 430 that connect the subscriber cable fibers to the termination regions 350, 350'.

The cable routing scheme of FIG. 11 includes a first cable routing path and a second cable routing path. The first cable routing path directs optical fibers from the cable access region 210 to the termination region 350 on the first swing frame 300 and back to the cable access region 210. The second cable routing path directs optical fibers from the cable access region 210 to the termination region 350' on the second swing frame 300' and back to the cable access region 210. Typically, the first cable routing path mirrors the second cable routing path.

Figure 12:
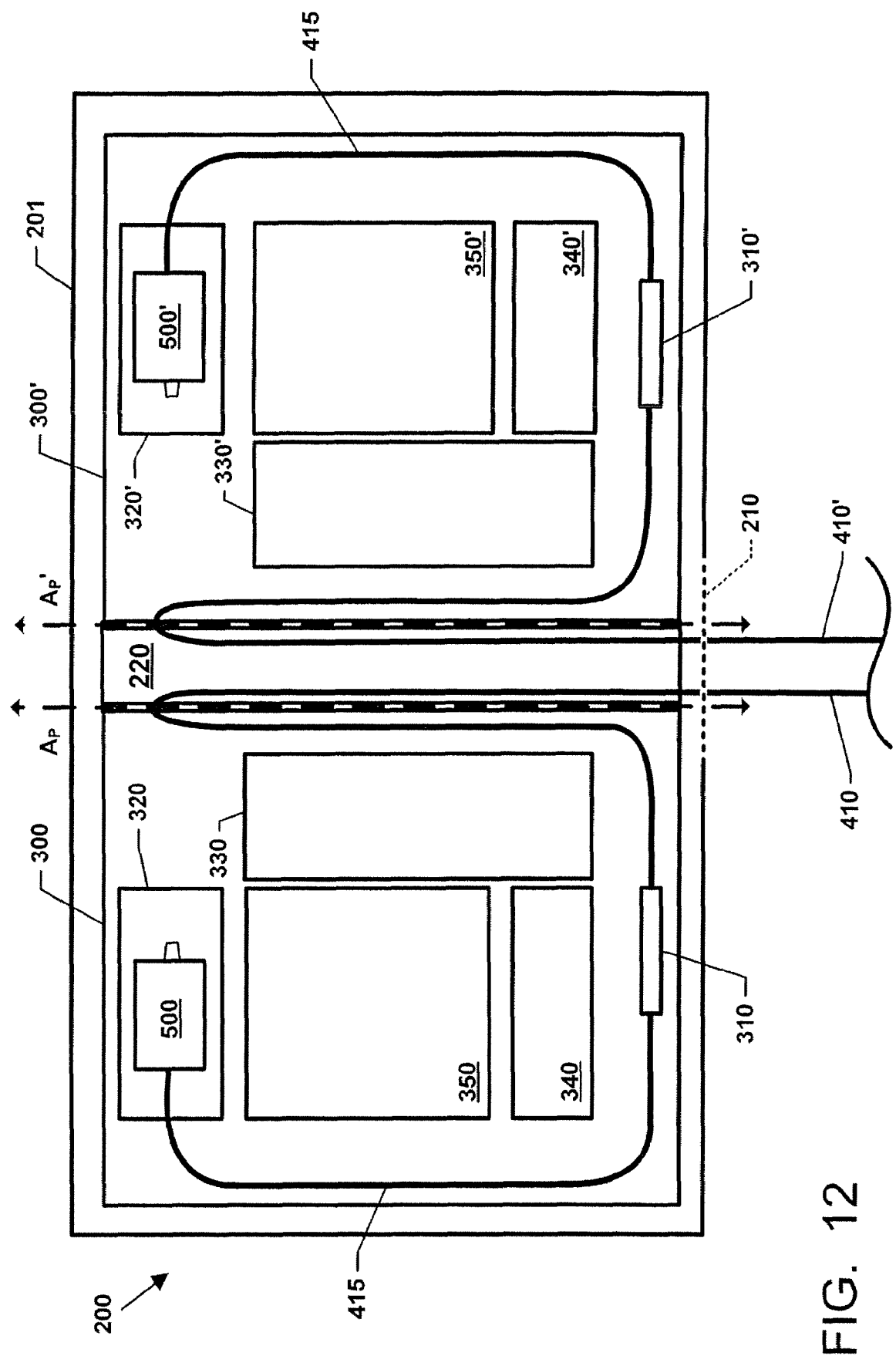
FIG. 12 is a schematic diagram of a first segment of each of the cable routing paths of FIG. 11.
Figure 13:
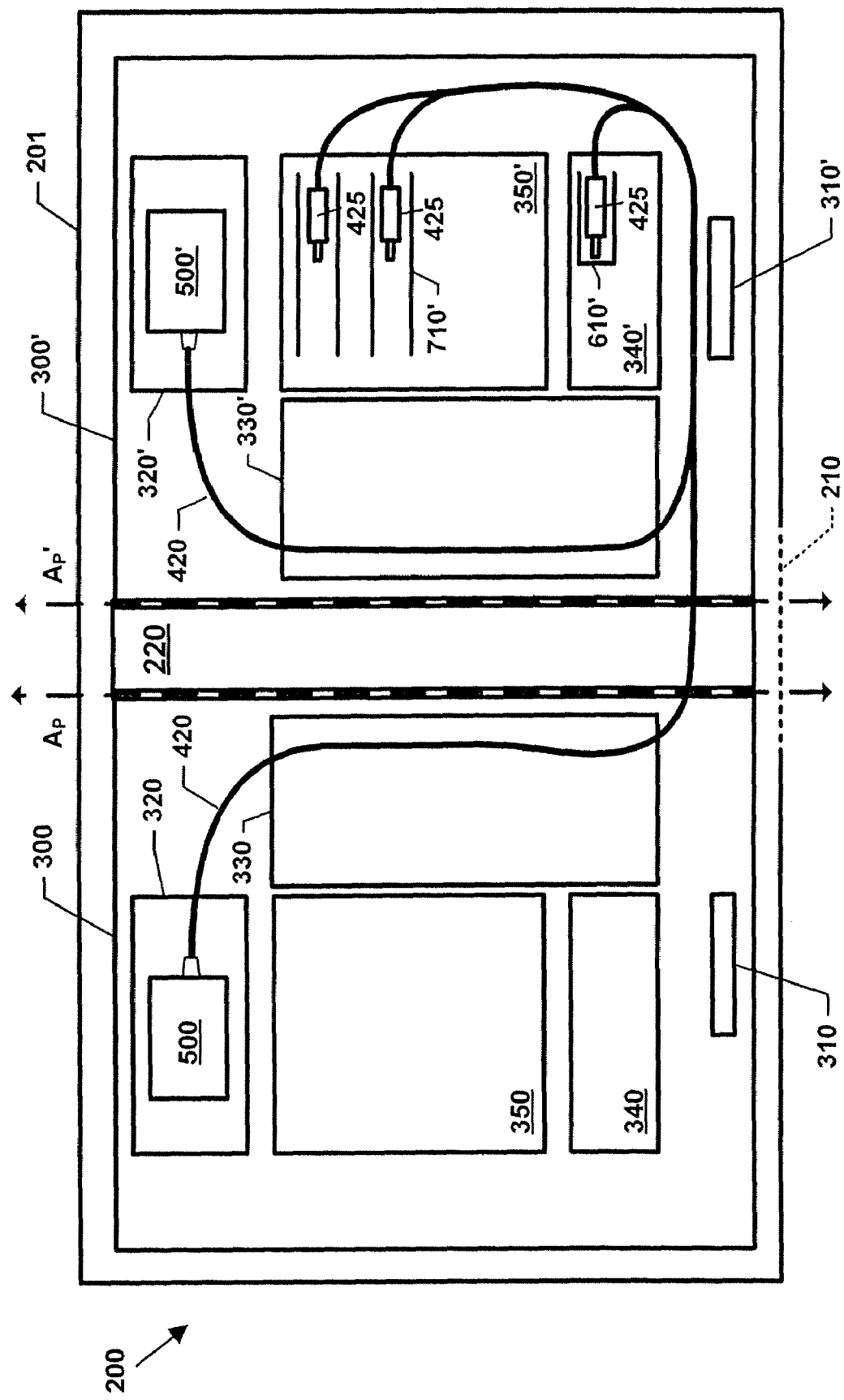
FIG. 13 is a schematic diagram of a second segment of each of the cable routing paths of FIG. 11.
Figure 14:
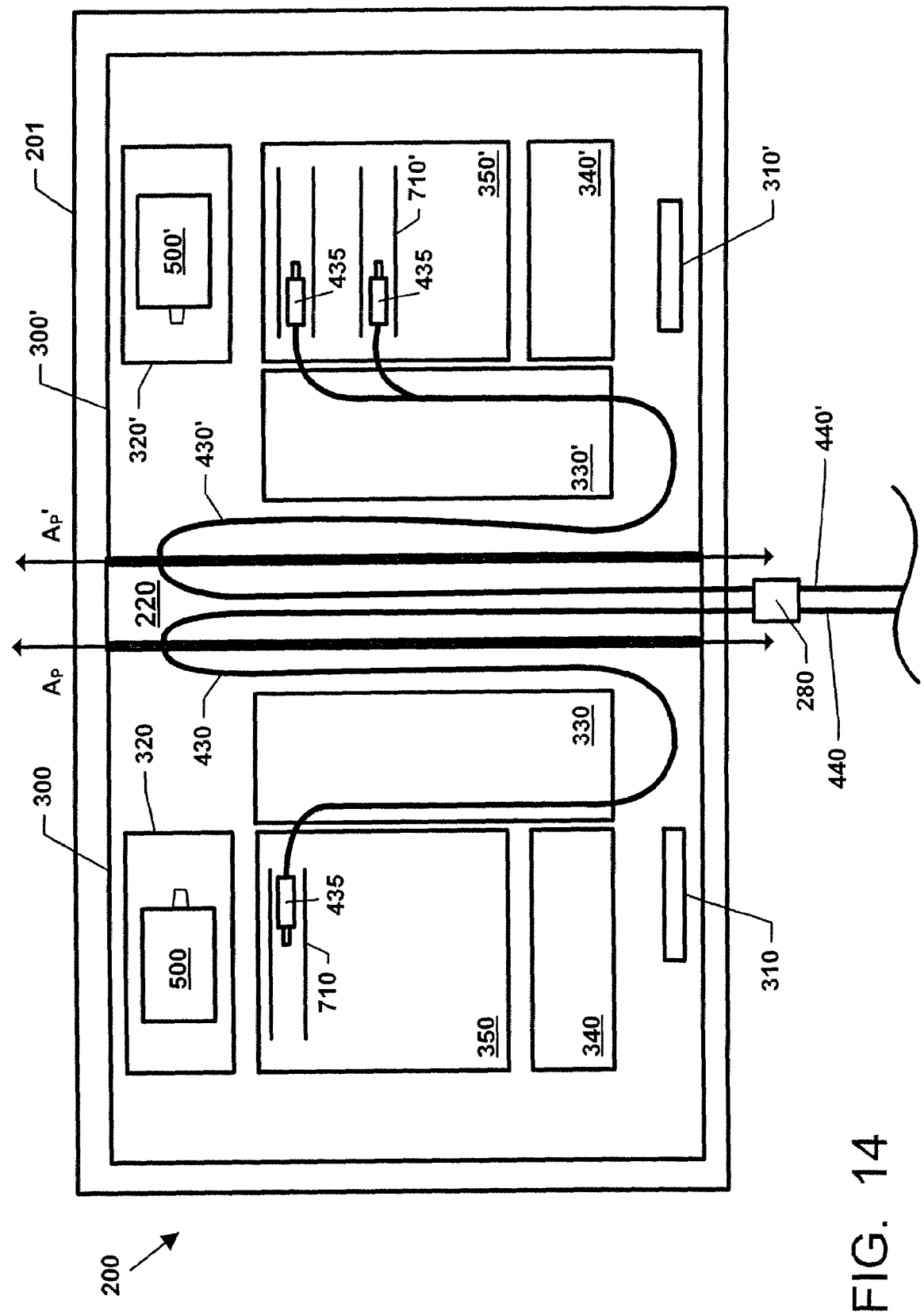
FIG. 14 is a schematic diagram of a third segment of each of the cable routing paths of FIG. 11.

In the example shown, the first and second cable routing paths include three main segments. The first segment is shown in FIG. 12; the second segment is shown in FIG. 13; and the third segment is shown in FIG. 14. As shown in FIG. 12, feeder cable fibers are initially routed into the cabinet housing 201 through the cable access region 210. In certain embodiments, the fibers of the feeder cables 410 can include ribbon fibers. An example feeder cable 410 may include twelve to forty-eight individual fibers connected to a service provider central office 101 (FIG. 1).

After passing through the cable access region 210, the fibers of the feeder cable can be routed to one or both swing frames 300, 300' along the cable routing paths. In one example embodiment, after entering the cabinet housing 201, the fibers of a feeder cable 410 are routed along the first segment of the cable routing path. Typically, the feeder cable 410 is routed up one of the sides 222, 224 of the mounting bulkhead 225, down a rear side of one or both of the swing frames 300, 300' adjacent the mounting bulkhead 225, and then back up the swing frame 300, 300' to the splitter region 320, 320' (see also FIG. 18).

In the example shown in FIG. 12, the fibers of a first feeder cable 410 are routed to a first feeder cable interface 310 (e.g., a fiber optic adapter module, a splice tray, etc.) installed on the first swing frame 300. At the feeder cable interfaces 310, one or more of the fibers of the feeder cable 410 are individually connected to separate splitter input fibers 415 that are routed to the first splitter region 320. In other embodiments, however, the fibers of the feeder cable 410 can be routed directly to the first splitter region 320, thereby bypassing or eliminating the need for an intermediate feeder cable interface 310.

At the first splitter region 320, the splitter input fibers 415 (or the fibers of the feeder cables 410) are connected to separate splitters 500 at which each of the fibers can be split into multiple pigtails 420 (FIG. 13). Each pigtail 420 has a connectorized end 425. The pigtails 420 generally extend along the second segment of the cable routing path from the splitter region 320 to the cable management regions 330 (FIG. 13). When the splitter pigtails 420 are not in service, the connectorized ends 425 can be temporarily stored on one or more storage receptacles 610 (FIG. 13) mounted at the storage regions 340. When the pigtails 420 are needed for service, the pigtails 420 are routed along the second segment of the first cable routing path from the splitters 500 to termination adapters 710 (FIG. 13) provided at the termination regions 350.

Figure 17:
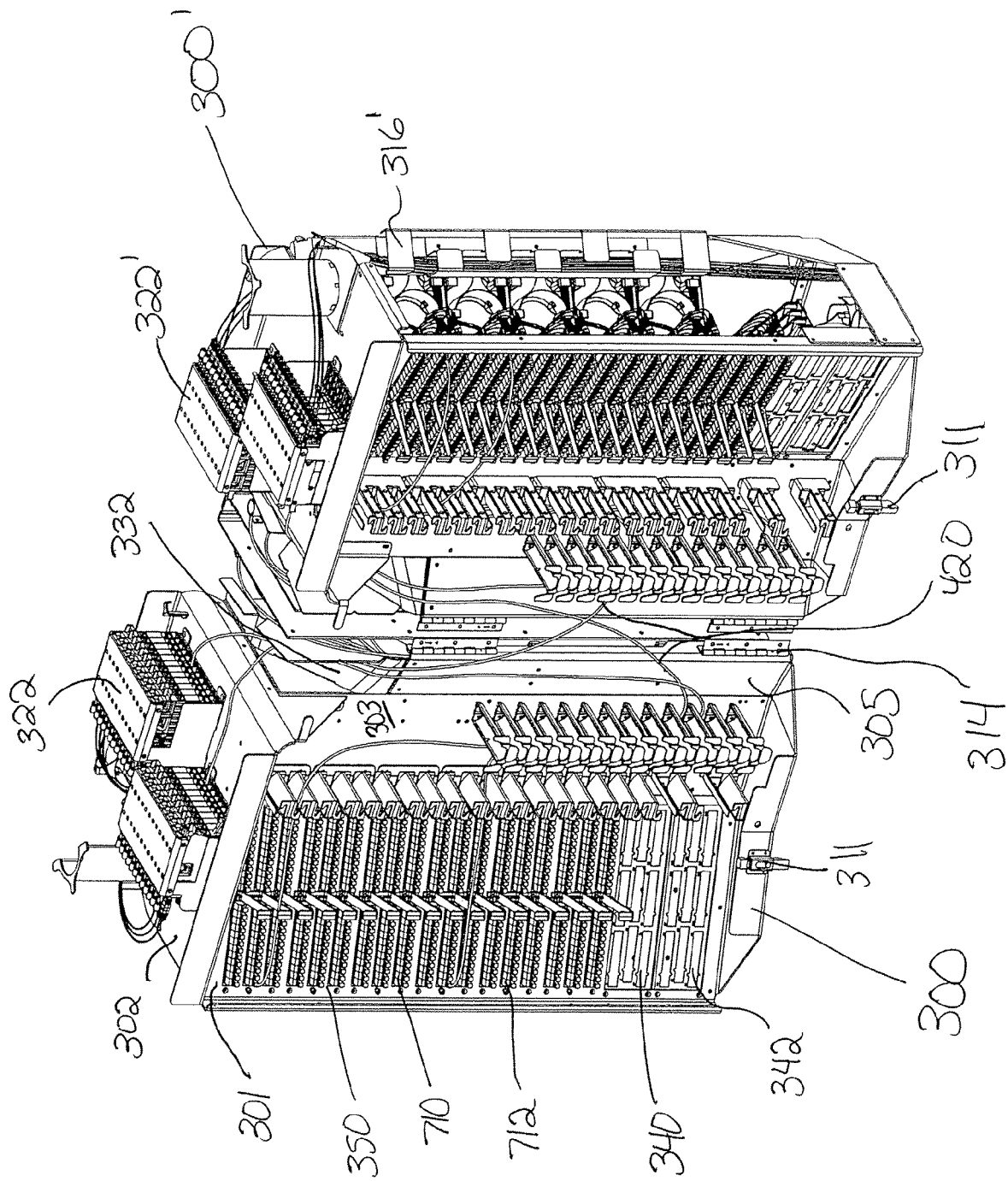
FIG. 17 is a front, perspective view of the first and second swing frames removed from the cabinet housing, splitter pigtails being routed over the front of the swing frames along the second segment of the routing cable paths of FIGS. 11 and 13.

In some embodiments, pigtails 420 extending from the splitter region 320 on the first swing frame 300 can be routed along the cable management panel 330 to the first termination region 350. In other embodiments, however, the pigtails 420 can be routed from the splitter region 320 on the first swing frame 300 to the termination region 350' on the second swing frame 300' (FIGS. 13 and 17). In such embodiments, the pigtails 420 are typically routed down along the cable management region 330 of the first swing frame 300. The pigtails 420 are then routed past the mounting post 220 to the second swing frame 300' and up the cable management region 330' of the second swing frame 300' to the second termination region 350' (see FIGS. 13 and 17).

In other embodiments, one or more fibers of the feeder cable 410 are not connected to any of the splitters 500, but rather are connected through the interface device 310 to pass-through fibers 412 (see FIGS. 19 and 20), which are routed past the splitter region to connect to the termination region 350. By refraining from splitting a fiber of a feeder cable 410, a stronger signal can be sent to one of the subscribers 105 (FIG. 1). The connectorized ends of the pass-through fibers 412 can be stored at the storage region 340 when not in use. In other embodiments, a feeder cable 410 having a connectorized end (not shown) can be routed directly to the termination region 350.

Figure 18:
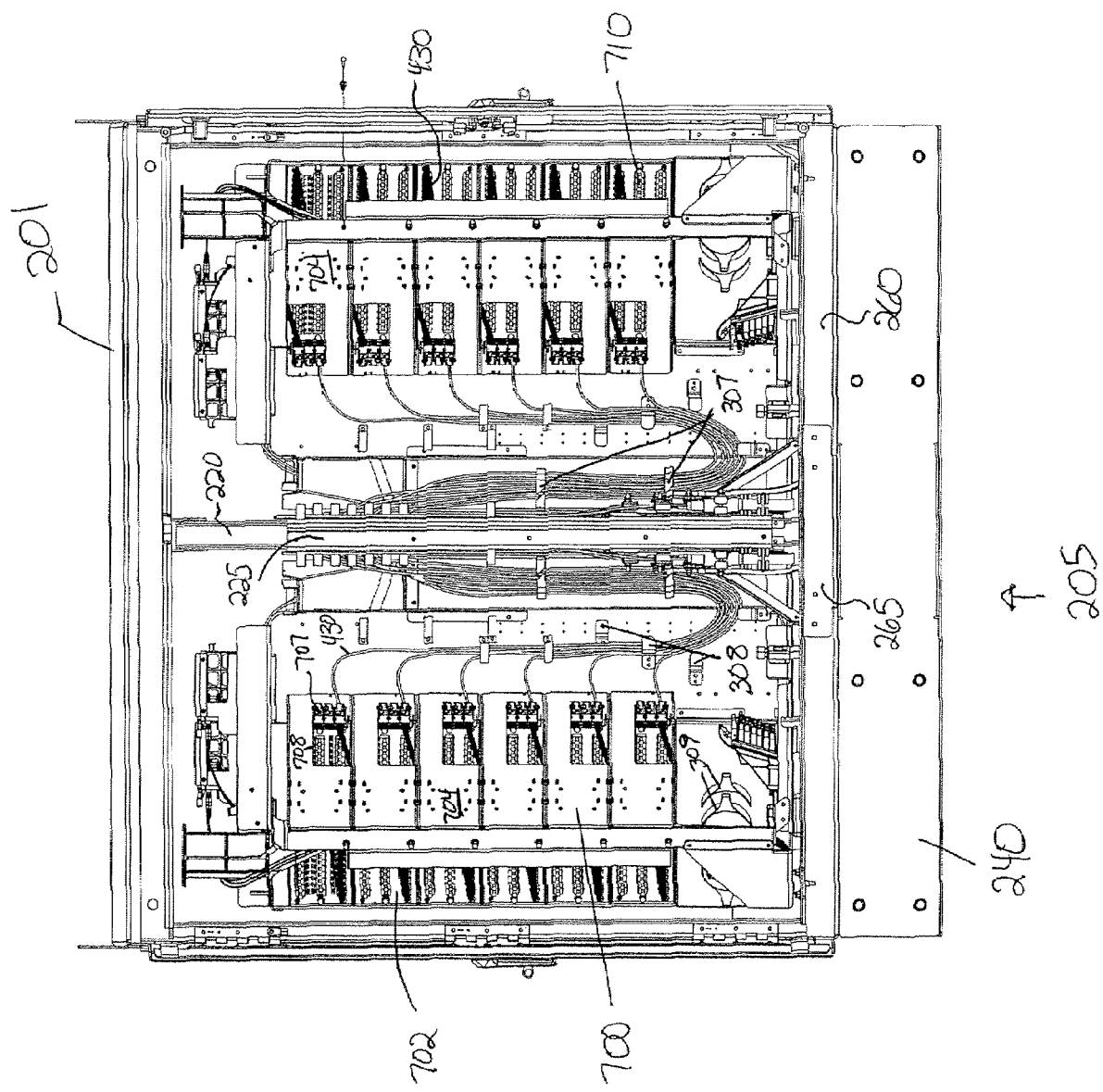
FIG. 18 is a rear view of the cabinet of FIG. 3 with the rear doors removed to reveal the rear sides of the first and second swing frames and stub cables precabled from a mounting bulkhead to termination modules on each swing frame.

At the termination region 350, the connectorized pigtails 420 are connected to the connectorized fibers of stub cables 430 or to intermediary cables (not shown) optically coupled to the stub cables 430. The stub cables 430 are directed along the third segment of the cable routing path back to the cable access region 210 and out of the cabinet housing 201 (see FIG. 14). In the example shown, the stub cables 430 are routed down the rear side of the termination region, up the rear side of the cable management panel 330, and down one side of the mounting bulkhead 225 to the cable access region 210 (FIG. 18).

The stub cables 430 are optically coupled to subscriber cables 440 at a coupling location 280 (FIG. 14). In certain embodiments, the coupling location 280 is housed within a generally hollow base 240 on which the cabinet housing 201 is mounted (FIGS. 2 and 3). The base 240 defines at least one access panel (not shown) through which the interior of the base 240 and, hence, the coupling location 280, can be accessed to optically couple the stub cables 430, 430' to the subscriber distribution cables 440. In various embodiments, the stub cables 430 range in length from about 25 feet to about 300 feet.

A typical subscriber cable 440 forms the F2 portion of a network (see FIG. 1) and typically includes a plurality of fibers (e.g., 144, 216 or 432 fibers) that are routed from the cabinets 200 to the subscriber locations 105 (FIG. 1). The termination regions 350, 350', therefore, are the dividing line between incoming fibers and the outgoing fibers. In other embodiments, the subscriber cables 440 can be routed directly into the cabinet housing 201. These subscriber cables 440 are connected either to the termination regions 350, 350' or to intermediary fibers (not shown).

The above described cable routing scheme in combination with the placement of the pivot axes $A_P$, $A_P'$ of the swing frames 300, 300' provides excess fiber length along the points of flex for fibers routed within the cabinet 200. Each segment of the cable routing path routes fibers along a path parallel to and adjacent the axes Ap, Ap$^1$. Routing the fibers up and down the cabinet interior adjacent the mounting post 220 inhibits twisting, bending, or kinking of the fibers when the swing frames 300, 300' are pivoted between the "swung in" and "swung out" positions. For example, the fibers can distribute any rotational movement caused by pivoting the swing frames 300, 300' along the length of the fibers.

Figure 15:
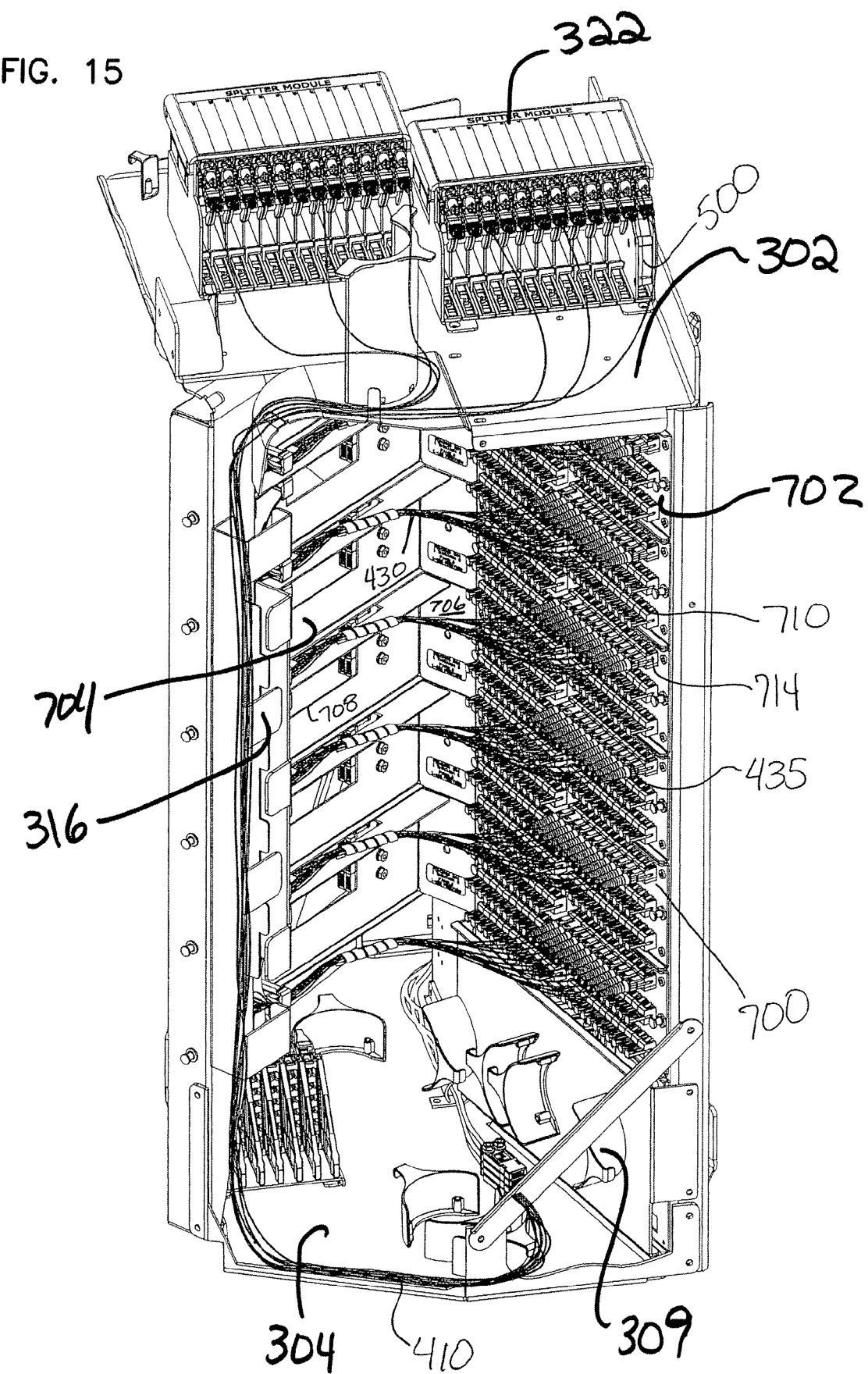
FIG. 15 is a left, rear perspective view of the first swing frame removed from the cabinet housing and being pre-cabled with stub cables.
Figure 16:
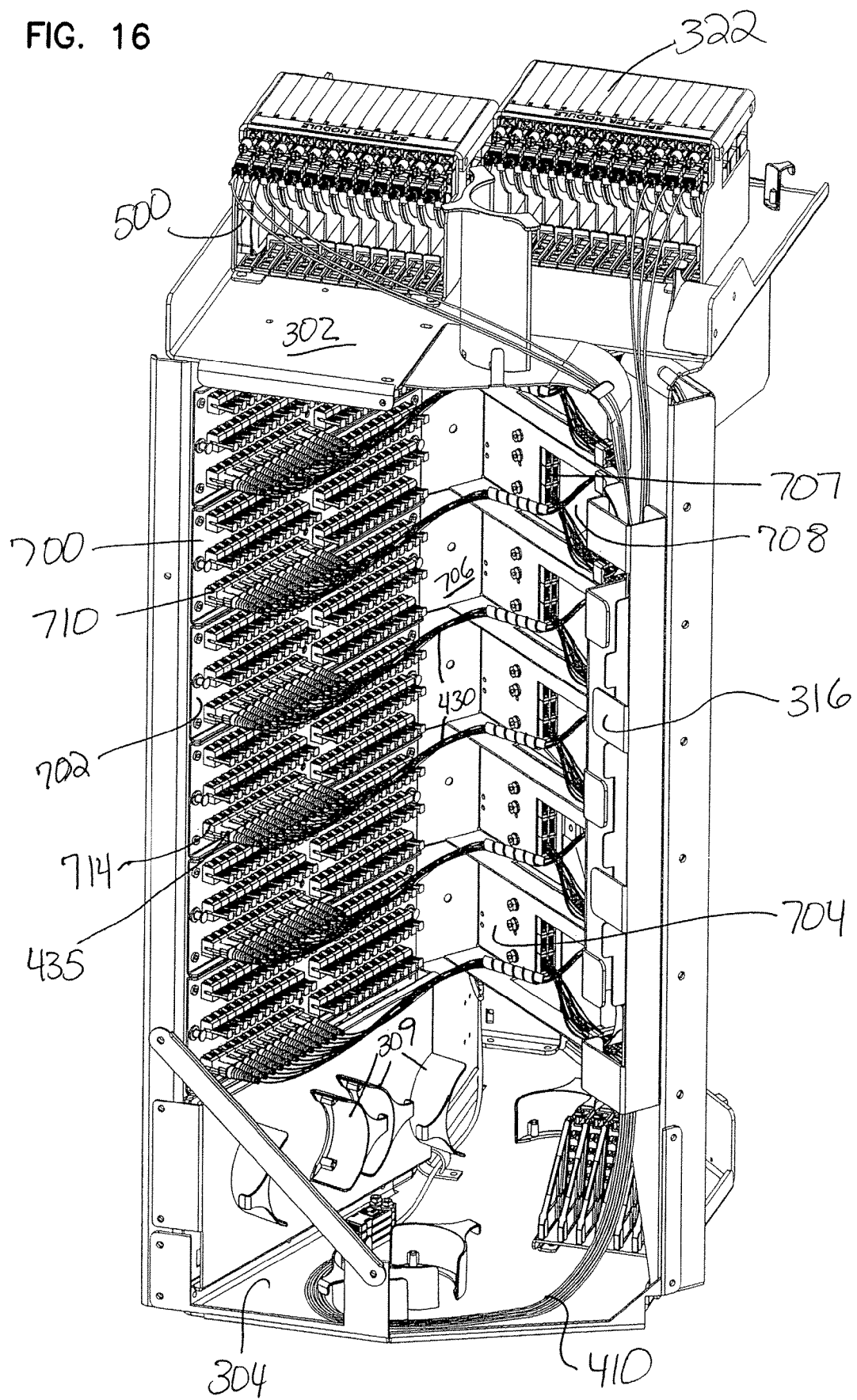
FIG. 16 is a right, rear perspective view of the second swing frame removed from the cabinet housing and being pre-cabled with stub cables.

Referring to FIGS. 15 and 16, in certain embodiments, the termination regions 350, 350' can be fully loaded with adapters and pre-terminated in the factory with 435, 435' stub cables 430, 430' (see FIGS. 15, 16, and 18). At the factory, connectorized ends of the stub cable fibers 430, 430' are coupled to the termination regions 350, 350' (e.g., inserted into the rear sides of termination adapters 710 installed at the termination region 350, 350') (FIGS. 15 and 16). Preconfiguring the cabinet 200 reduces the chance that cabling will be done incorrectly. During deployment of the cabinet 200, the other ends of the stub cable fibers 430, 430' are spliced or otherwise connected in the field to the fibers of one or more subscriber distribution cables 440 at the coupling location 280. The subscriber cable 440 can then be routed from the cabinet 200 to subscriber locations 105 (FIG. 1).

Some of the fibers of the feeder cable 410 can be protected within the cabinet housing 201 by loose buffer tubes. Fan-out blocks can be provided at suitable locations within the cabinet housing 201 to separate and join ribbon fibers. Spools, clips, holders, brackets or other cable management structures can also be provided within the cabinet housing 201 to facilitate managing the fibers of cables 410, 420, 430, 440 routed within of the cabinet housing 201.

Referring to FIGS. 15-20, the components of the swing frames 300, 300' will now be discussed in more detail. For clarity, only the components mounted to the first swing frame 300 will be discussed. However, it should be understood that the second swing frame 300' typically mirrors the first swing frame 300 and so the description applies to both swing frames 300, 300'. Alternatively, each of the components could be mounted elsewhere within the cabinet housing 201.

Figure 19:
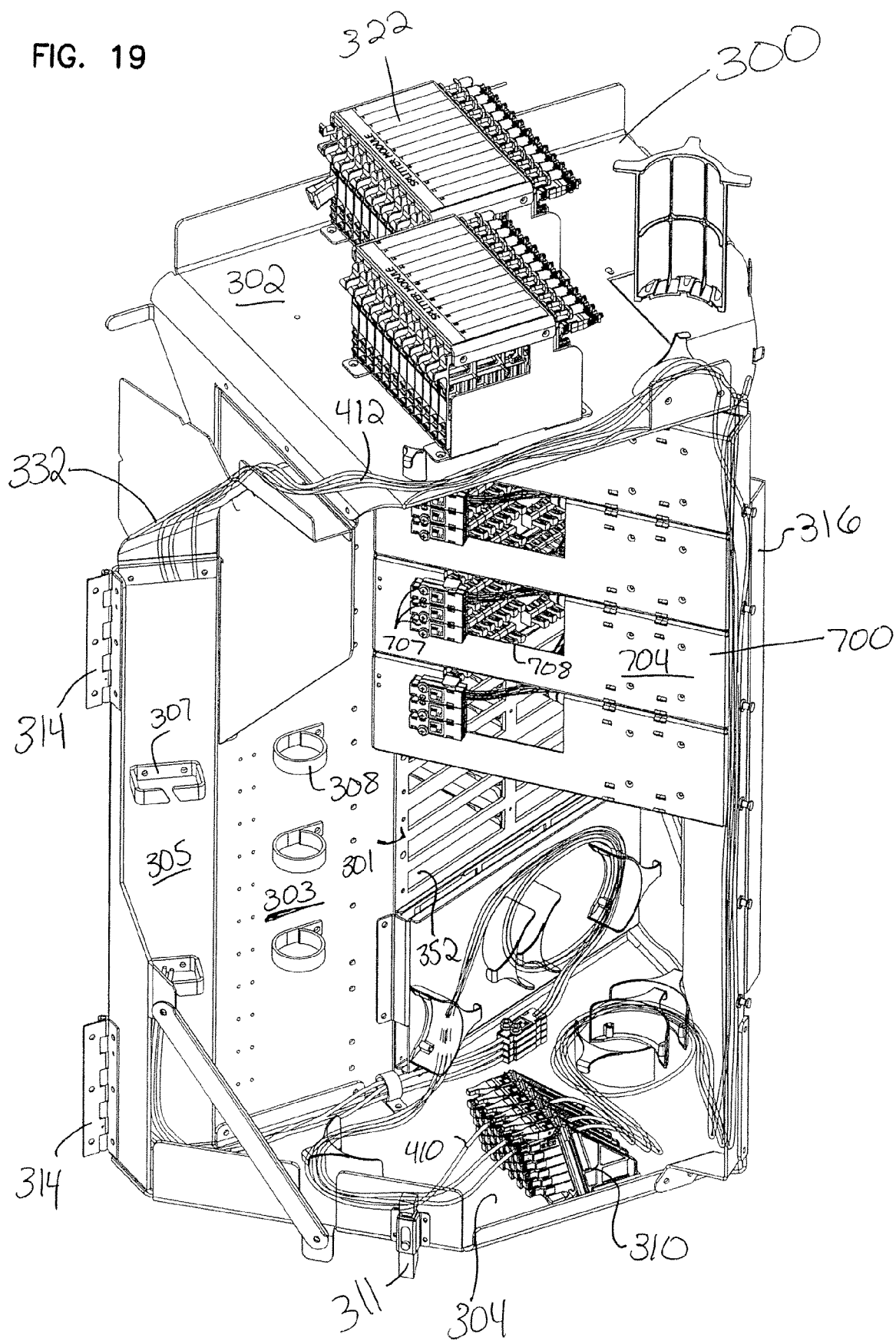
FIG. 19 is a right, rear perspective view of the first swing frame removed from the cabinet housing and being cabled with pass-through fibers.
Figure 20:
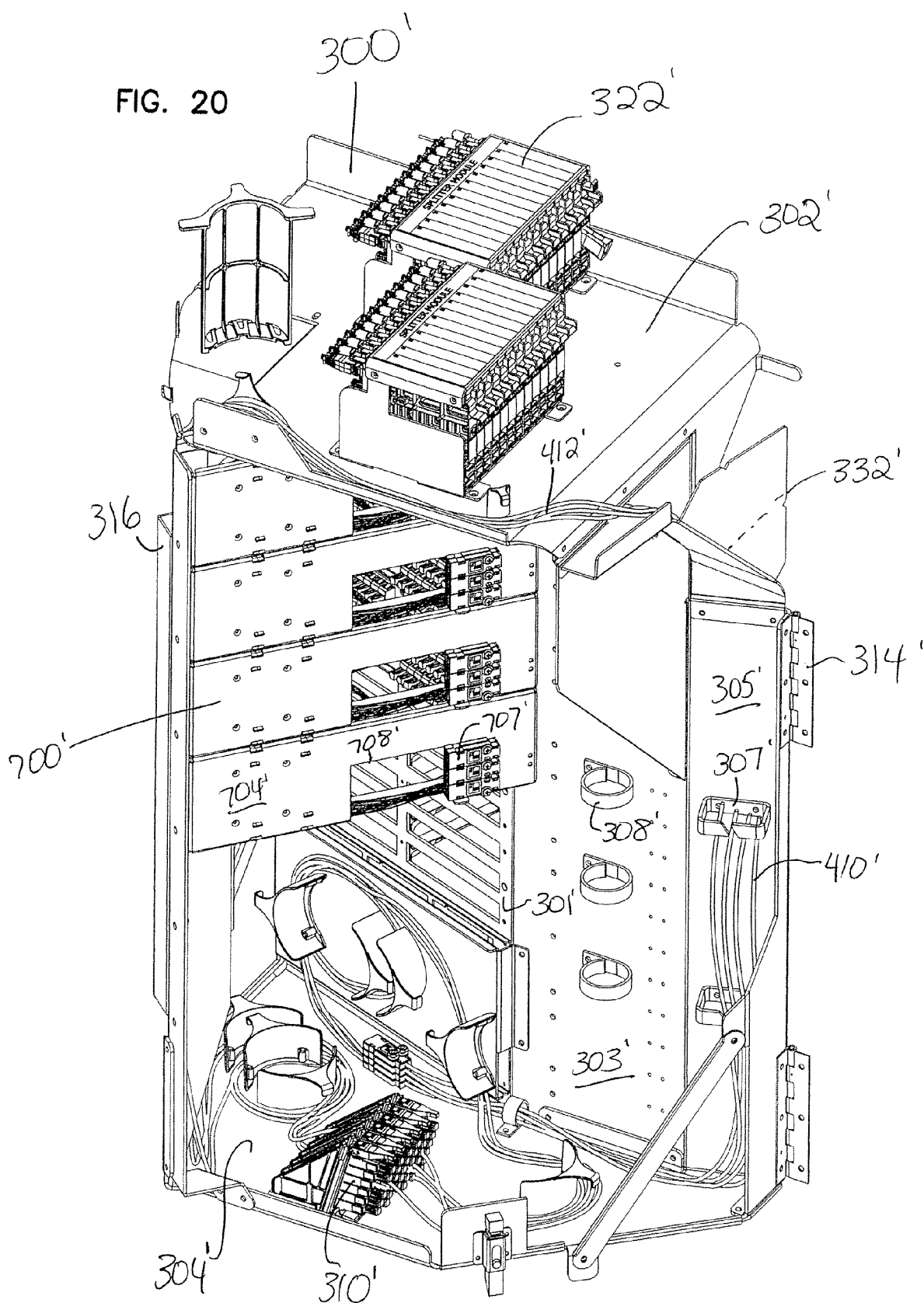
FIG. 20 is a left, rear perspective view of the second swing frame removed from the cabinet housing and being cabled with pass-through fibers.

In general, the swing frame 300 includes a primary bulkhead 301 extending between a top panel 302 and a bottom panel 304 (FIG. 15). The splitter region 320 is provided on the top panel 302 and the cable interface region 310 is provided on the bottom panel 304. Typically, the storage region 340 is provided on the front of the primary bulkhead 301 (FIG. 17) and the termination region 350 extends through a portion of the primary bulkhead 301 from the front to the rear (FIGS. 19-20). Cable management devices 309, such as bend limiters and clips, can be provided on the rear of the primary bulkhead 301 opposite the storage region 340 (FIGS. 15 and 16).

A secondary bulkhead 303 also extends between the top and bottom panels 302, 304. Cable management devices 308 can be provided on the rear of the secondary bulkhead 303 (FIGS. 19 and 20). One edge of the secondary bulkhead 303 couples to the primary panel 301 (FIG. 17). The opposite edge of the secondary bulkhead 303 couples to a hinge-mounting panel 305 (FIGS. 19 and 20). Hinges 314 or other fasteners pivotably couple the hinge-mounting panel 305 to the mounting post 220 (FIG. 3).

The cable management region 330 is provided on the front of the secondary bulkhead 303 (FIG. 17). In the illustrated example, the cable management region 330 includes a ramp 332 extending downwardly from the top panel 302 to the front side of the secondary bulkhead 303 (see FIG. 6). The cables can be routed through the radius limiters 334, 336 (FIG. 6) or other cable management structures provided on the front of the secondary bulkhead 303 either to the storage region 340 or to the termination region 350 on either of the swing frames 300, 300'. The ramp 303 is typically provided within close proximity of the mounting post 220 to provide a sufficient length of splitter fiber 420 adjacent the pivot axes $A_P$, $A_P'$ to inhibit kinking the fiber 420 as discussed above (FIG. 6).

The splitter region 320 includes a splitter module housing 322 provided on the top panel 302. The splitter module housing 322 is configured to protect, organize, and secure the splitters 500. The splitter module housing 322 can be constructed in various sizes to accommodate different numbers of splitter modules 500. The module housing 322 is further configured to enable the splitters 500 to receive an input fiber, such as splitter input fiber 415 (FIG. 11), on one end of the splitter 500 and to output multiple fibers, such as splitter pigtails 420 (FIG. 11), from the opposing end of the splitter 500.

Typically, each splitter 500 receives between one and four fibers 415 and outputs between two and sixteen fibers 420 for every input fiber 415. In one example embodiment, four input fibers 415 enter a splitter 500 and thirty-two pigtail fibers 420 exit the splitter 500. Further information regarding example splitters 500 can be found in U.S. patent application Ser. No. 11/354,297, filed Feb. 13, 2006, entitled "Fiber Optic Splitter Module;" U.S. application Ser. No. 10/980,978, filed Nov. 3, 2004, entitled "Fiber Optic Module And System Including Rear Connectors;" U.S. application Ser. No. 11/138,063, filed May 25, 2005, entitled "Fiber Optic Splitter Module;" U.S.

application Ser. No. 11/215,837, filed Aug. 29, 2005, entitled "Fiber Optic Splitter Module With Connector Access;" and U.S. application Ser. No. 11/321,696, filed Dec. 28, 2005, entitled "Splitter Modules For Fiber Distribution Hubs," the disclosures of which are hereby incorporated by reference.

In addition, the swing frame 300 can be configured with different interface devices 310 (see FIG. 11) to receive incoming feeder cables 410. Information regarding one example type of interface device, an adapter pack, can be found in U.S. application Ser. No. 11/095,033, filed Mar. 31, 2005, and entitled "Adapter Block Including Connector Storage;" and U.S. Pat. Nos. 5,497,444; 5,717,810; 5,758,003; and 6,591,051, the disclosures of which are hereby incorporated by reference. Any other suitable type of interface device, such as a splice tray, can also be used. Splitter input cables 415 (FIGS. 15 and 16) or pass-through cables 412 (FIGS. 19 and 20) are routed from the interface devices 310, up the swing frame 300 through cable management structures 316, and to the splitter region 320 on the top panel 302 (FIGS. 15 and 16).

As shown in FIG. 17, the storage region 340 also defines one or more openings 342 into which storage modules 610 (see FIG. 11) can be mounted. The connectorized pigtails 420 of the splitters 500 are typically stored in one or more of the storage modules 610 prior to installation on the swing frame 300, thereby enabling the splitters 500 and storage modules 610 to be added incrementally to the swing frame 300. Additional information regarding the storage modules 610 can be found in U.S. application Ser. No. 10/610,325, filed on Jun. 30, 2003, entitled "Fiber Optic Connector Holder and Method; "U.S. application Ser. No. 10/613,764, filed on Jul. 2, 2003, entitled "Telecommunications Connection Cabinet;" and U.S. application Ser. No. 10/871,555, filed on Jun. 18, 2004, entitled "Multi-position Fiber Optic Connector Holder and Method," the disclosures of which are hereby incorporated by reference.

The termination region 350 generally includes multiple termination adapters 710 configured to receive and optically couple two terminated optical fibers. The termination adapters 710 extend from a front to a rear of the primary bulkhead 301. Typically, the primary bulkhead 301 defines one or more columns of openings 352 (FIG. 7) through which the adapters 710 extend. Strips 359 (FIG. 17) separate the openings 352 of each column and provide surface area for adhering labeling information (e.g., connector designation).

In certain embodiments, the termination adapters 710 are mounted to one or more termination modules 700 which can mount to the primary bulkhead 301. Each termination module 700 includes at least one row of termination adapters 710 for connecting the fibers of the feeder cable 410 to the fibers of the subscriber cable 440. Each adapter 710 has a front end 712 (FIG. 17) and a rear end 714 (FIG. 15). The front end 712 of each adapter 710 is configured to retain a connector 425 of a fiber 420 interfaced with the feeder cable 410. The rear end 714 of each adapter 710 is configured to retain a connector 435 of a fiber interfaced with the subscriber cable 440 (or stub cable 430).

As time passes and the number of subscribers increases, additional termination adapters 710 can be added to the swing frame 300. For example, one or more termination module 700 can be installed on the swing frame 300. Each termination module 700 includes a termination leg 702 and a management leg 704 arranged in a substantially L-shaped configuration (FIGS. 15 and 16). In some embodiments, a linking section 706 connects the termination leg 702 to the management leg 704 (FIGS. 15 and 16). The linking section 706 can be monolithically formed with the termination leg 702 and the management leg 704 (e.g., the module 700 can be constructed as a single piece of bent sheet metal).

In some embodiments, a front side of the termination leg 702 of the termination module 700 mounts to the rear side of the primary bulkhead 301, for example, using screws or other temporary or permanent fasteners such as bolts, and rivets. The management leg 704 extends generally rearwardly from an inner side (i.e., the side nearest the mounting post 220) of the termination leg 702 (FIGS. 15 and 16). Typically, the management leg 704 extends rearwardly from where the primary bulkhead 301 couples to the secondary bulkhead 303 (see FIGS. 19 and 20). The management legs 704 of the termination modules 700 can be secured to one another or to the swing frame 300 as shown in FIGS. 15, 16, 19, and 20.

The termination leg 702 defines openings in which the adapters 710 can be installed. The adapters 710 typically extend from the termination leg 702 and through the openings 352 (FIG. 19) defined in the primary bulkhead 301 so that the connectors 425 enter the front ends 712 of the adapters 710 from a front side of the primary bulkhead 301 and the connectors 435 of the subscriber cable 440 enter the adapters 710 from a rear side of the primary bulkhead 301.

Each management leg 704 includes an appropriate number of fanouts 707 (FIGS. 19 and 20) to accommodate the adapters 710 on the termination module 700. For example, in one embodiment, the termination leg 702 of a module 700 includes six rows of adapters 710, each row having twelve adapters 710, and the management leg 704 includes six 12:1 fanouts 707. As the term is used herein, a 12:1 fanout is a fanout configured to receive twelve optical fibers and to output a single cable ribbon containing the twelve fibers. In another embodiment, nine 8:1 fanouts or three 24:1 fanouts could be provided instead of the 12:1 fanouts. In still other embodiments, the fanouts 707 can be used to upjacket the fiber.

In some embodiments, the management leg 704 of the termination module 700 also includes at least one cable management device 713 (FIG. 9) for managing excess fiber length of the stub cable fibers 430. In such systems, the fibers 430 are typically routed first to the cable management device 713 and then to the fanouts 707. Examples of cable management devices 713 include one or more radius bend limiters, one or more fiber clips, and other such devices.

The management leg 704 of the termination module 700 typically defines an opening 708 (FIGS. 19 and 20) through which the stub cable fibers 430 are routed from the cable management devices 713 to the fanouts 707. Upon exiting the fanouts 707, the ribbon fibers are routed towards the bottom panel 304 through the cable management structures 308 provided on the rear side of the secondary bulkhead 303 (FIG. 18). The ribbon fibers are then routed back up towards the top panel 302 through the cable management structures 307 provided on the hinge-mounting panel 305 and down a side 222, 224 of the mounting bulkhead 225 to the cable access region 210 (see FIG. 18).

As discussed above, in some embodiments, the termination modules 700 can be precabled at the factory to include connectorized fibers of a stub cable 430 coupled to each adapter 710. The connector 435 of each stub cable fiber is mounted within the rear end 714 of an adapter 710 and the stub cable fibers are routed from the connector 710 to the fanouts 707 provided on the management leg 704 of the termination module 700. In such cases, dust caps can be provided on the front ends 712 of the adapters 710 to protect the terminated stub fibers 430 from dust, dirt, and other contaminants.

Referring now to FIGS. 21-24, the cabinet housing 201 can be replaced without disrupting the internal components of the cabinet 200. This "reskinnable" feature is advantageous if the cabinet housing 201 ever becomes damaged (e.g., if the cabinet housing 201 sustains structural damage due to a collision with an automobile). In general, the cabinet housing 201 is designed to be separable from the mounting post 220, the mounting bulkhead 225, and the swing frames 300, 300'.

Figure 21:
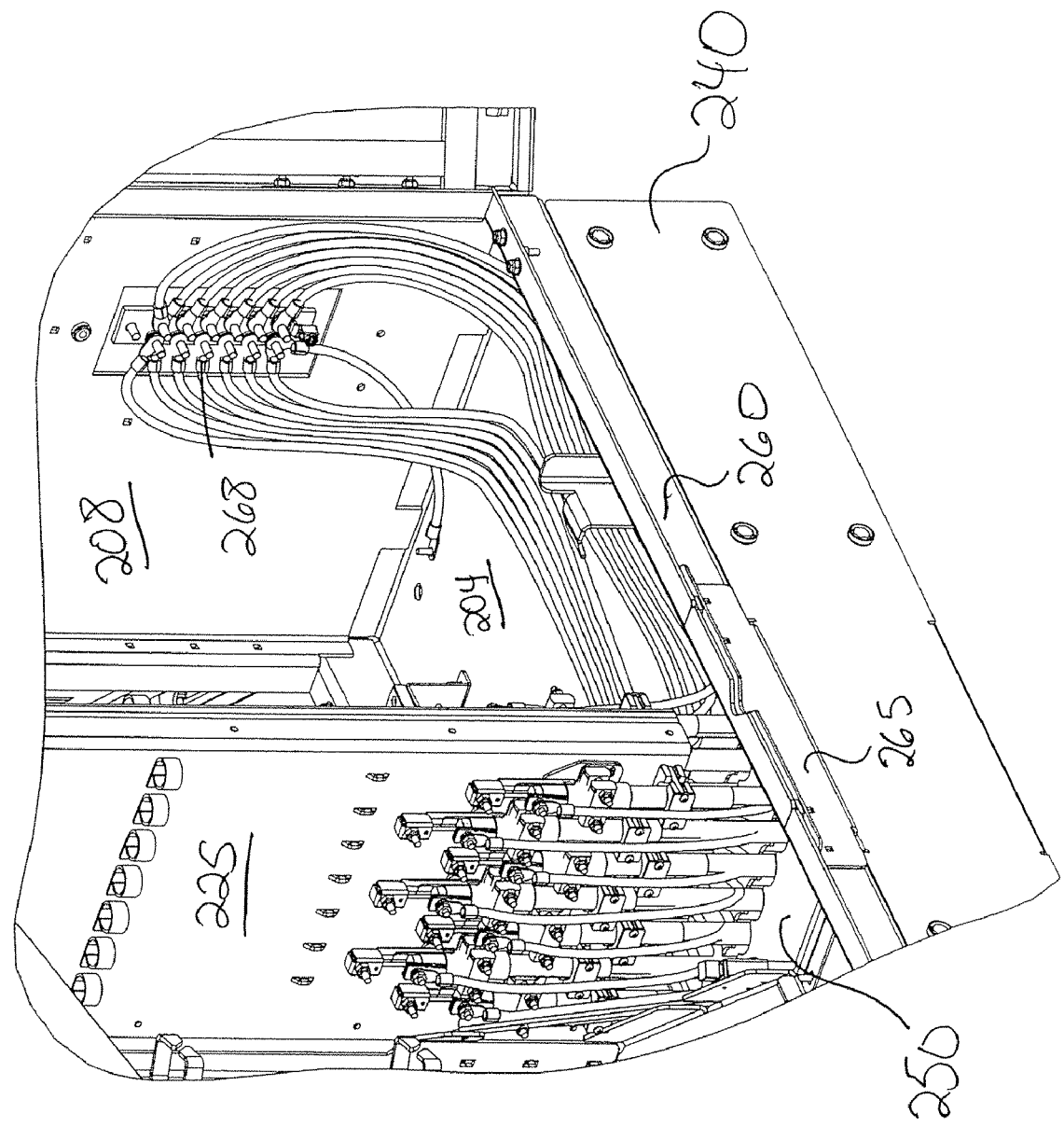
FIG. 21 is a partial, rear perspective view of the cable access region and rear lip of the cabinet housing of FIG. 3 with the rear doors removed.
Figure 22:
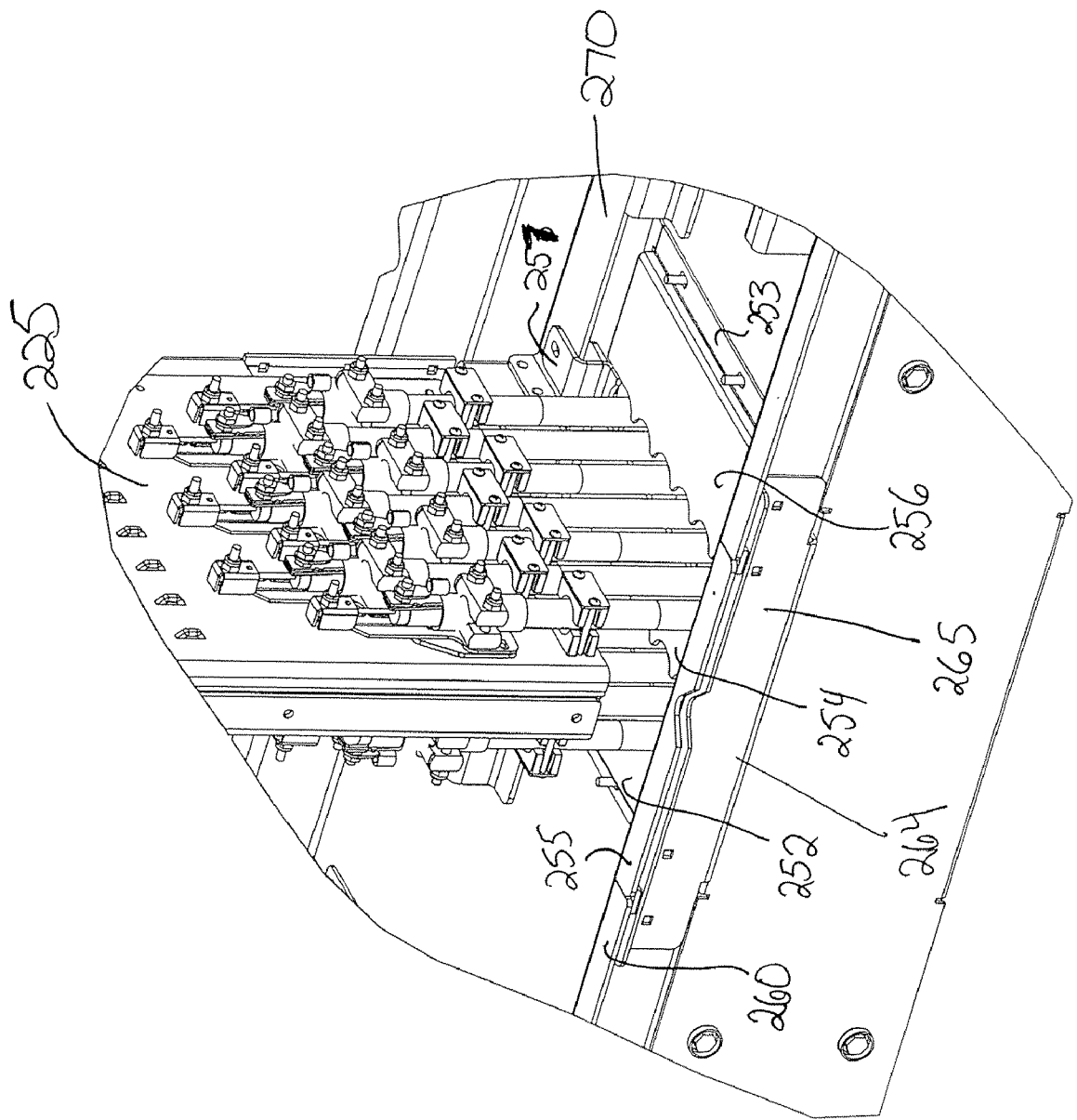
FIG. 22 is a partial, rear perspective view of a panel arrangement covering the cable access region and an access panel covering a portion of the lip of FIG. 21.

In addition, the cabinet housing 201 is configured to be replaced without removing the feeder cables 410 and stub cables 430 from the mounting bulkhead 225 (FIG. 21). To this end, a panel arrangement 250 (FIG. 23) is provided over the cable access region 210 to protect the internal components of the cabinet 200 from environmental contamination (see FIG. 22). The panel arrangement 250 is removably coupled to the cabinet housing 201 to cover the opening defined in the cable access region 210. The panel arrangement 250 typically includes multiple pieces that cooperate to form one or more apertures 258 through which cables (e.g., feeder cables 410 and stub cables 430) can extend (see FIG. 22).

Figure 23:
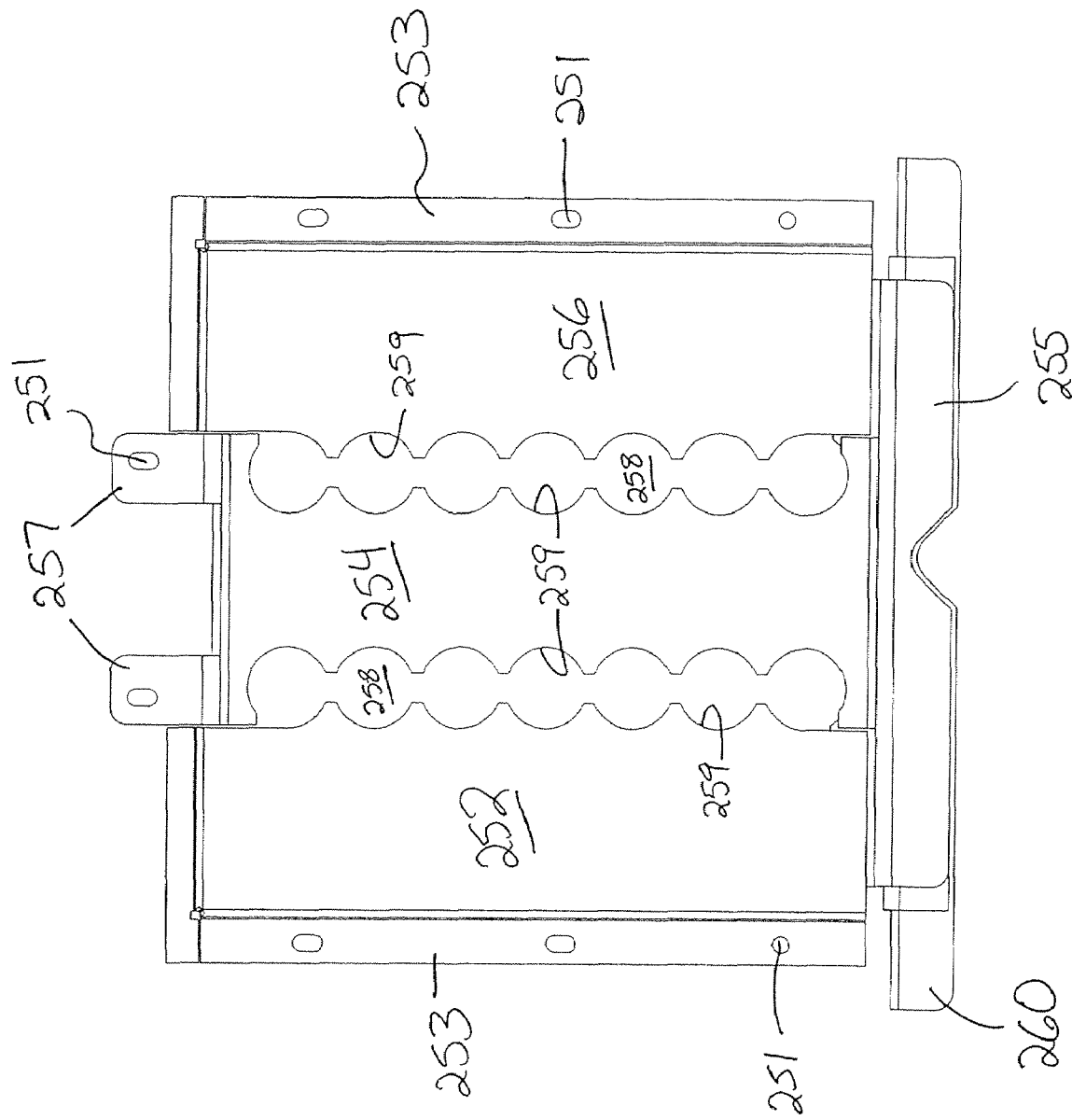
FIG. 23 is a top view of the panel arrangement of FIG. 22 removed from the cabinet housing.

One example panel arrangement 250 is shown in FIG. 23. The example panel arrangement 250 includes an intermediate panel 254, a first end panel 252 arranged on one side of the intermediate panel 254, and a second end panel 256 arranged on an opposite side of the intermediate panel 254. The inside edge of each of the end panels 252, 256 forms one or more concave detents 259. The outer edges of the intermediate panel 254 also form one or more concave detents 259.

When arranged, the concave detents 259 on the first end panel 252 cooperate with the concave detents 259 on the intermediate panel 254 to form a first set of openings 258 through which the cables 410, 430 can extend. The concave detents 259 on the second end panel 252 also cooperate with the concave detents 259 on the intermediate panel 254 to form a second set of openings 258 through which the cables 410, 430 can extend.

The first and second end panels 252, 256 each have a fastening section 253 extending along the outer edge, opposite the intermediate panel 254. Each fastening section includes one or more apertures 251 through which fasteners may be inserted. The intermediate panel 254 has at least one fastening section 257 extending outwardly from the intermediate panel 254 towards the open front 203 of the cabinet housing 201. Typically, the fastening section 257 includes first and second protruding tabs defining apertures 251. The intermediate panel 254 also includes a flange 255 extending towards the open rear 205 of the cabinet. Apertures can also be provided on the flange 255. The panels 252, 254, 256 can each be installed over the cable access region 210 by inserting fasteners through the apertures 251 in the fastening sections 253 (FIG. 22).

In some embodiment, a lip 260 (FIG. 22) extends upwardly from the rearward edge of the bottom panel 204 of the cabinet housing 201. The lip 260 inhibits optical fibers from spilling out from the cabinet interior. Generally, the lip 260 is L-shaped. In one embodiment, the lip 260 is interrupted (e.g., defines an opening or space) at a central portion 264 of the lip 260. Typically, the opening defined by the lip 260 is continuous with the opening defined by the cable access region 210 (see FIG. 4). For example, in the example shown in FIG. 4, the length $L_L$ of the interruption generally matches a length $L_A$ of the cable access region 210.

A lip access panel 265 can be removably coupled to the lip 260 to cover the interruption in the lip 260 (see FIGS. 21 and 22). As shown in FIG. 22, one embodiment of the access panel 265 can extend over an outer and bottom portion of the lip 260. Removing the access panel 265 and the panel arrangement 250 reveals the continuous opening defined by the cable access region 210 and the central portion 264 of the lip 260 (see FIG. 4).

Figure 24:
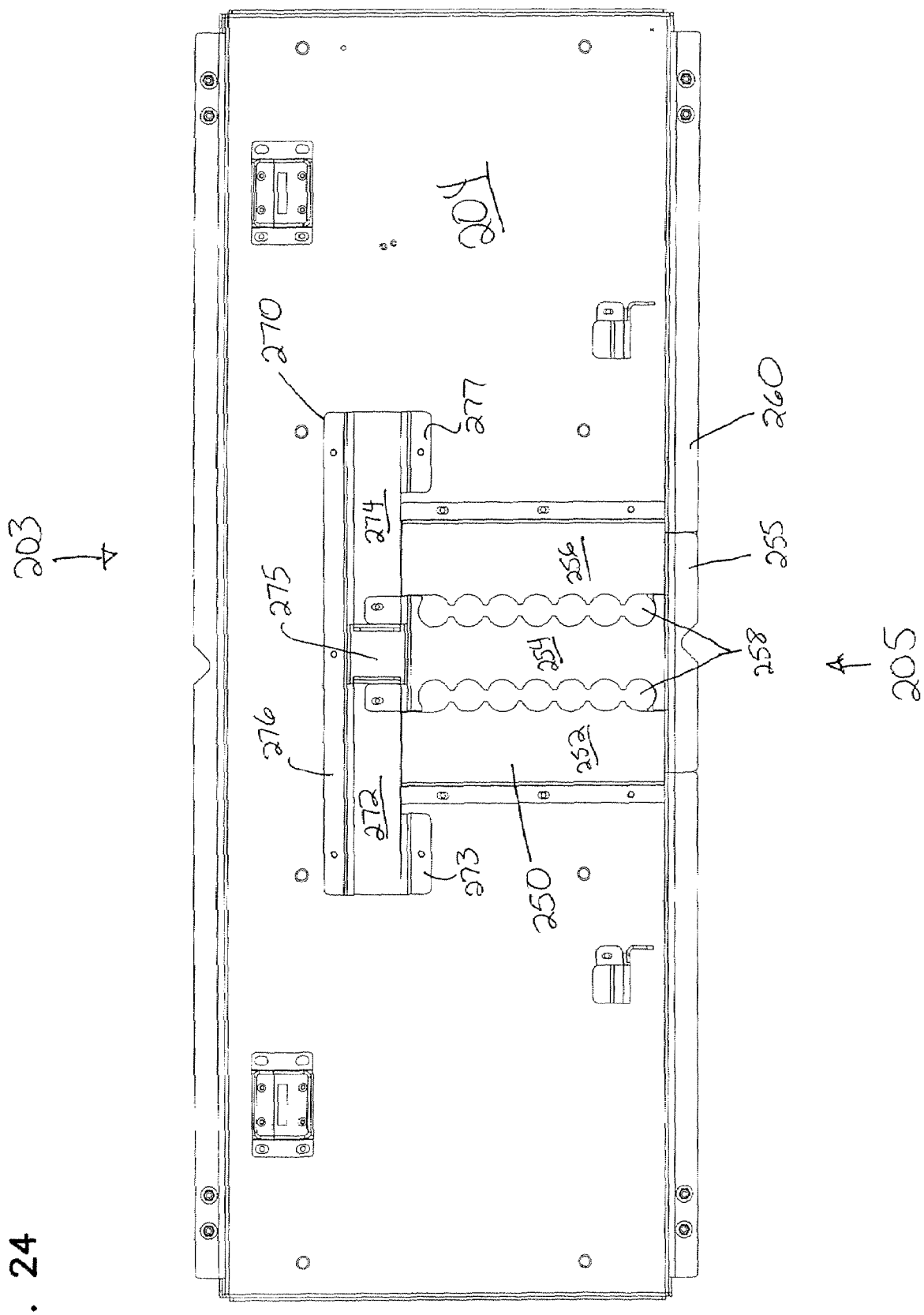
FIG. 24 is a top view of the panel arrangement of FIG. 23 installed on the bottom panel of the cabinet housing of FIG. 21.

FIG. 24 illustrates a top view of the panel arrangement 250 installed over the bottom panel 204 of the cabinet housing 201. The panel arrangement is also coupled to a mounting post bracket 270. The mounting post bracket 270 includes a first U-shaped member 272 and a second U-shaped member 274 spaced from the first member 272 to define an aperture 275. A first fastening side 276 extends from one side of both the first member 272 and the second member 274. Second and third fastening sides 273, 277 extend from the opposite side of the first member 272 and second member 274, respectively.

The mounting post bracket 270 is secured to the bottom panel 204 of the cabinet housing 201. In general, the mounting post bracket 270 is arranged to receive the bottom end of the mounting post 220 within the aperture 275. The mounting post bracket 270 is further configured to facilitate releasing the mounting post 220 from the mounting post bracket 270. The intermediate panel 254 can also be removably secured to the mounting post bracket 270. For example, the protruding tabs 257 can couple to the first and second members 272, 274 as shown in FIG. 24.

Figure 25:
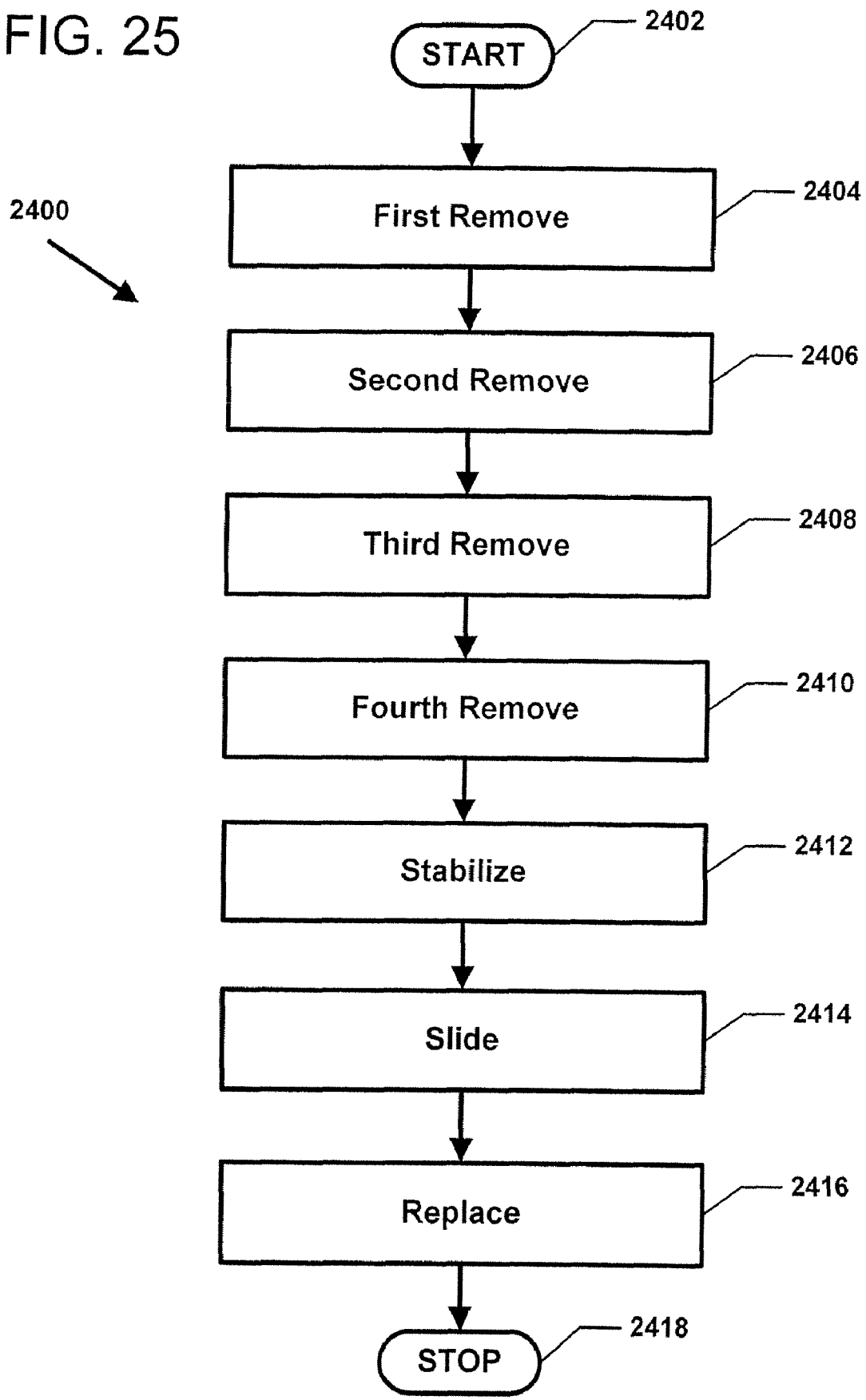
FIG. 25 is an operational flow for a process for replacing the cabinet housing without disturbing the internal components of the cabinet housing.

FIG. 25 illustrates an operational flow for an example process for replacing the housing 201 of a telecommunications cabinet 200. The process 2400 begins at start module 2402 and proceeds to a first remove operation 2404. The first remove operation 2404 removes the access panel 265 from the lip 260 on the cabinet housing 201 to reveal the opening in the lip 260. A second remove operation 2406 removes the panels 252, 254, 256 of the panel arrangement 250 from the cabinet housing 201 to expose the opening defined by the cable access region 210.

A third remove operation 2408 removes any grounding wires 268 extending between the cables coupled to the mounting bulkhead 225 and the cabinet housing 201 (see FIG. 21). A fourth remove operation 2410 uncouples the mounting post 220 and mounting bulkhead 225 from the cabinet housing 201. For example, the remove operation 2410 can disengage the mounting post 220 from the mounting bracket 270. A stabilize operation 2412 props or otherwise maintains the internal components of the cabinet 200 in an upright or otherwise safe position while disengaged from the cabinet housing 201.

A fifth remove operation 2414 slides (or otherwise moves) the cabinet housing 201 away from the internal components. For example, the fifth remove operation 2414 can slide the cabinet housing 201 forwardly of the base 240 until the internal components have passed through the open rear 205 and cleared the housing 201. A replace operation 2418 installs a new cabinet housing around the internal components. Typically, the new cabinet housing also includes a continuous opening defined by a cable access region and an interrupted lip through which the cables can pass when the new housing is being installed. The mounting post 220 is secured to the new cabinet housing. The process 2400 ends at stop module 2418.

It will be appreciated that the fiber distribution hub 200 can be manufactured in a variety of different sizes. However, to promote manufacturing efficiency, it is preferred for the splitters to be manufactured with pigtails having uniform lengths. To accommodate the different sizes of fiber distribution hubs, the pigtails are preferably designed long enough to work in the largest fiber distribution hub expected to be used. For the smaller distribution hubs, excess length provided in the pigtails can be taken up by routing the excess length through various cable management structures.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A telecommunications cabinet adapted to provide an interface between at least a first incoming fiber, a second incoming fiber, and a plurality of outgoing fibers, the telecommunications cabinet comprising:
a cabinet housing having a front, a rear, a first end, and a second end opposite the first end, the cabinet housing including a first door for accessing an interior of the cabinet housing from the front of the cabinet housing;
a mounting post extending within the interior of the cabinet housing from the first end to the second end, the mounting post dividing the interior into a first portion and a second portion;
a first swing frame pivotably mounted to a first side of the mounting post at the front of the cabinet housing, the first swing frame being movable between a first position in which the first swing frame is inside the first portion of the cabinet housing interior and a second position in which the first swing frame extends at least partially outside the front of the cabinet housing;
a second swing frame pivotably mounted to a second, opposite side of the mounting post at the front of the cabinet housing, the second swing frame being movable between a first position in which the second swing frame is inside the second portion of the cabinet housing interior and a second position in which the second swing frame extends at least partially outside the front of the cabinet housing;
a first termination region provided on the first swing frame, the first termination region configured to optically couple the first incoming fiber to some of the outgoing fibers; and
a second termination region provided on the second swing frame, the second termination region configured to optically couple the second incoming fiber to others of the outgoing fibers.

2. The telecommunications cabinet of claim 1, further comprising:
a first splitter region provided on the first swing frame, the first splitter region configured to house at least one splitter configured to receive the first incoming fiber and to output a plurality of pigtail fibers optically coupled to the first incoming fiber; and
a second splitter region provided on the second swing frame, the second splitter region configured to house at least one splitter configured to receive the second incoming fiber and to output a plurality of pigtail fibers optically coupled to the second incoming fiber.

3. The telecommunications cabinet of claim 2, wherein the first splitter region is positioned above the first termination region and the second splitter region is positioned above the second termination region.

4. The telecommunications cabinet of claim 2, further comprising:
a first storage region provided on the first swing frame, the first storage region configured to receive the splitter pigtails output from either the splitter housed in the first splitter region or the splitter housed in the second splitter region.

5. A fiber distribution hub comprising:
a cabinet housing defining an interior, the cabinet housing including a cable access region through which cables can enter and exit the interior of the cabinet housing;
a first swing frame pivotably mounted within the interior of the cabinet housing, the first swing frame being pivotable about a first pivot axis, the first swing frame including a first termination region, a first splitter region located at a first end of the first termination region, and a first storage region located at a second, opposite end of the first termination region; and
a second swing frame pivotably mounted within the interior of the cabinet housing, the second swing frame being pivotable about a second pivot axis, the second pivot axis being generally parallel with the first pivot axis, the second swing frame including a second termination region, a second splitter region located at a first end of the second termination region, and a second storage region located at a second, opposite end of the second termination region;
wherein the first swing frame defines a first cable routing path, the first cable routing path including a first path segment along which a first feeder cable can enter the cabinet housing, a second path segment along which at least one connectorized cable can extend from the first splitter region to the first termination region, and a third path segment along which a first subscriber cable can exit the cabinet housing;
wherein the second swing frame defines a second cable routing path, the second cable routing path including a first path segment along which a second feeder cable can enter the cabinet housing, a second path segment along which at least one connectorized cable can extend from the second splitter region to the second termination region, and a third path segment along which a second subscriber cable can exit the cabinet housing; and
wherein the first, second, and third path segments of the first cable path extend generally parallel to and adjacent the first pivot axis; and
wherein the first, second, and third path segments of the second cable path extend generally parallel to and adjacent the second pivot axis.

6. Method for reskinning a cabinet, the method comprising opening a door of a cabinet to obtain access to an interior of the cabinet through an open side of the cabinet, the open side facing in a first direction, the cabinet housing a mounting post, a first swing frame pivotably coupled to the mounting post, and a second swing frame pivotably coupled to the mounting post;
removing an access panel from a lip extending partially over the open side of the cabinet to reveal a first aperture extending in the first direction through the lip;
removing a panel arrangement from a cable access region of the cabinet to reveal a second aperture defined in the cable access region, the second aperture being continuous with the first aperture;
uncoupling the mounting post from the cabinet; and
sliding the cabinet in a second direction opposite the first direction, wherein the mounting post, the first swing frame, and the second swing frame do not slide with the cabinet.

7. A telecommunications cabinet comprising:
a housing defining an interior and housing internal components installed within the interior of the housing, the housing defining an open side leading to the interior, the open side facing a first direction;

a cable access region defined in the housing adjacent the open side, the cable access region defining an opening through which cables enter and exit the interior of the housing;

a first cable extending through the cable access region and into the interior of the housing; and a panel arrangement removably coupled to the housing over the cable access region, the panel arrangement including an intermediate panel, a first end panel, and a second end panel, wherein the intermediate panel cooperates with the first end panel to define a first set of apertures through which cables can extend and the intermediate panel cooperates with the second end panel to define a second set of apertures through which cables can extend.

8. The telecommunications cabinet of claim 7, wherein the internal components comprise:

a mounting post removably coupled to interior surfaces of the housing;

a first swing frame pivotably mounted to a first side of the mounting post;

a second swing frame pivotably mounted to a second side of the mounting post; and a mounting bulkhead coupled to the mounting post, the mounting bulkhead extending in the first direction within the interior of the housing from the mounting post.

9. The telecommunications cabinet of claim 7, further comprising:

an interrupted lip having a length and a width, the lip extending longitudinally along the third edge of the first end panel and extending laterally over the open side from the third edge, the lip defining an opening adjacent the cable access region of the first end panel; and an access panel removably coupled to the first lip over the opening.

* * * * *